United States Patent
Satoh

(10) Patent No.: US 9,142,129 B2
(45) Date of Patent: Sep. 22, 2015

(54) VEHICLE SURROUNDINGS MONITORING DEVICE

(75) Inventor: Noriyuki Satoh, Saitama (JP)

(73) Assignee: Clarion Co., Ltd., Saitama-Shi (JP)

( * ) Notice: Subject to any disclaimer, the term of this patent is extended or adjusted under 35 U.S.C. 154(b) by 463 days.

(21) Appl. No.: 13/582,494

(22) PCT Filed: Mar. 8, 2011

(86) PCT No.: PCT/JP2011/055371
§ 371 (c)(1),
(2), (4) Date: Sep. 4, 2012

(87) PCT Pub. No.: WO2011/111701
PCT Pub. Date: Sep. 15, 2011

(65) Prior Publication Data
US 2012/0327238 A1 Dec. 27, 2012

(30) Foreign Application Priority Data
Mar. 10, 2010 (JP) .................................. 2010-052762

(51) Int. Cl.
G08G 1/16 (2006.01)
B60R 1/00 (2006.01)
G06T 3/40 (2006.01)
G06K 9/00 (2006.01)

(52) U.S. Cl.
CPC .. G08G 1/16 (2013.01); B60R 1/00 (2013.01); G06K 9/00805 (2013.01); G06T 3/4038 (2013.01); *B60R 2300/105* (2013.01); *B60R 2300/20* (2013.01); *B60R 2300/308* (2013.01)

(58) Field of Classification Search
CPC ..................... B60R 2300/105; B60R 2300/20; B60R 2300/308; B60R 2300/607; B60R 2300/303; B60R 2300/802; B60R 2300/8093; G08G 1/16; G06T 3/4038; G06T 2207/30261; G06K 9/0805
See application file for complete search history.

(56) References Cited

U.S. PATENT DOCUMENTS 6,923,080 B1 *  8/2005  Dobler et al. ................ 73/866.1
7,728,879 B2 *  6/2010  Ishii ......................... 348/222.1
(Continued)

FOREIGN PATENT DOCUMENTS

CN     1725857 A     1/2006
CN     1731450 A     2/2006
(Continued)

OTHER PUBLICATIONS

International Search Report w/translation from PCT/JP2011/055371 mailed Jun. 7, 2011 (2 pages).
(Continued)

Primary Examiner — Brian Yenke
(74) Attorney, Agent, or Firm — Locke Lord LLP; James E. Armstrong, IV; Brian S. Matross

(57) ABSTRACT

A virtual-screen setup unit sets up a virtual screen in a seam of images captured by an image capturing unit, the virtual screen being orthogonal to a road surface and extending in a direction from a near side to a far side of the vehicle. A virtual-screen projection image generation unit performs conversion of the images captured by the image capturing unit for projection onto the virtual screen, and thereby generates a virtual-screen projection image. The virtual-screen projection image is displayed on the image display unit.

15 Claims, 14 Drawing Sheets

(56) References Cited

U.S. PATENT DOCUMENTS

| | | | |
|---|---|---|---|
| 8,655,019 B2* | 2/2014 | Kamiyama | 382/103 |
| 2003/0085999 A1 | 5/2003 | Okamoto et al. | |
| 2003/0165255 A1* | 9/2003 | Yanagawa et al. | 382/104 |
| 2005/0111698 A1* | 5/2005 | Kawai | 382/103 |
| 2006/0018509 A1 | 1/2006 | Miyoshi et al. | |
| 2006/0029255 A1 | 2/2006 | Ozaki | |
| 2007/0085901 A1* | 4/2007 | Yang et al. | 348/47 |
| 2008/0181488 A1* | 7/2008 | Ishii et al. | 382/154 |
| 2009/0022423 A1* | 1/2009 | Ehlgen et al. | 382/284 |
| 2009/0257659 A1 | 10/2009 | Suzuki et al. | |
| 2010/0060735 A1* | 3/2010 | Sato | 348/148 |
| 2010/0092042 A1* | 4/2010 | Asari | 382/106 |
| 2010/0149333 A1* | 6/2010 | Yang | 348/143 |
| 2010/0220190 A1* | 9/2010 | Hiroshi | 348/148 |
| 2010/0246901 A1* | 9/2010 | Yang | 382/107 |
| 2010/0271481 A1* | 10/2010 | Hongo | 348/148 |
| 2011/0001826 A1* | 1/2011 | Hongo | 348/148 |
| 2011/0156887 A1* | 6/2011 | Shen et al. | 340/425.5 |
| 2011/0157361 A1* | 6/2011 | Wu et al. | 348/148 |

FOREIGN PATENT DOCUMENTS

| | | |
|---|---|---|
| CN | 1984323 A | 6/2007 |
| CN | 101438590 A | 5/2009 |
| JP | 2006-253872 A | 9/2006 |
| JP | 2007-36668 A | 2/2007 |
| JP | 2007-180720 A | 7/2007 |

OTHER PUBLICATIONS

Office Action dated Aug. 26, 2014, issued for the Chinese patent application No. 201180011651.5.

* cited by examiner

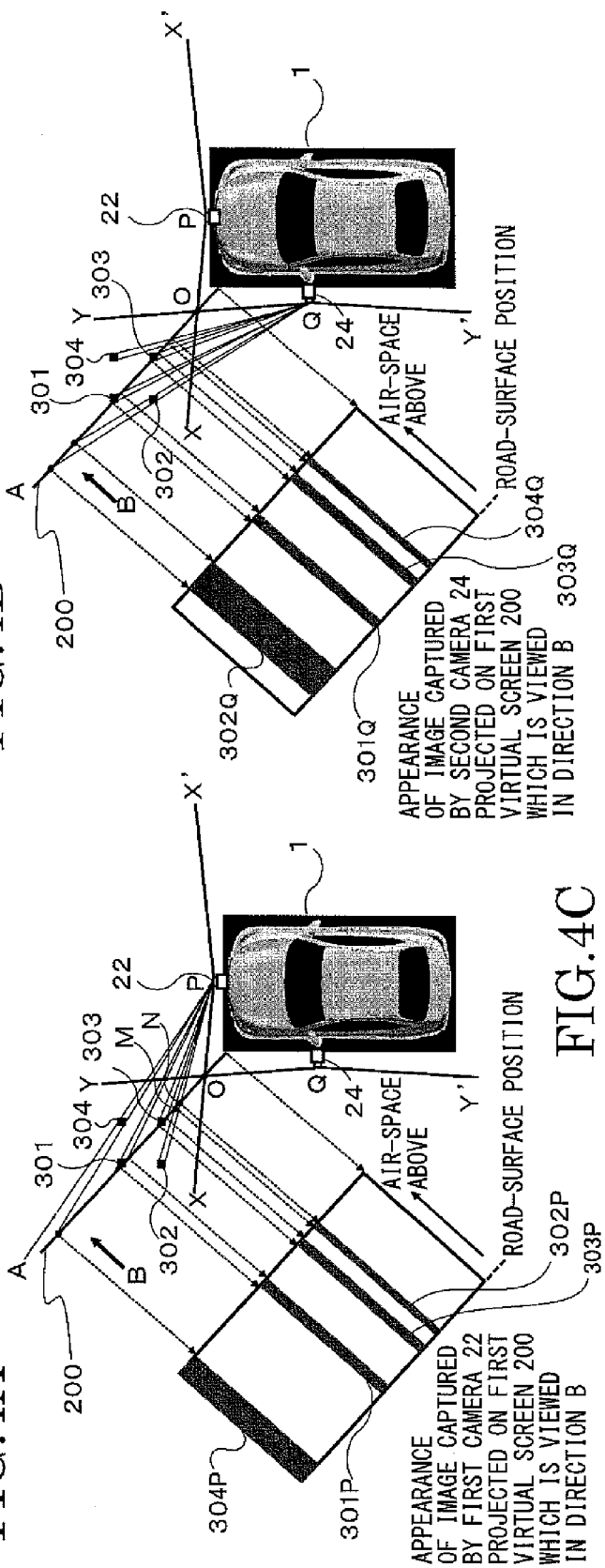
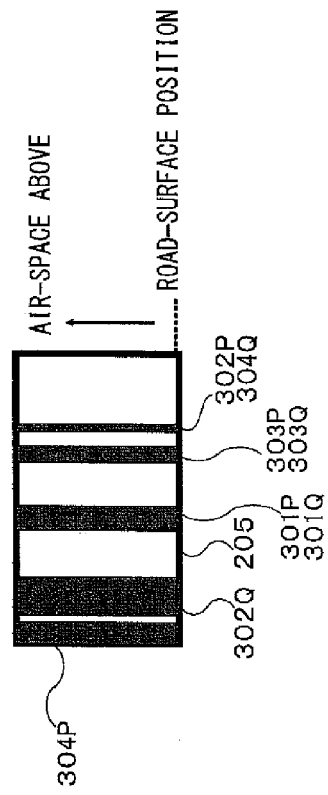
FIG.4A  FIG.4B  FIG.4C

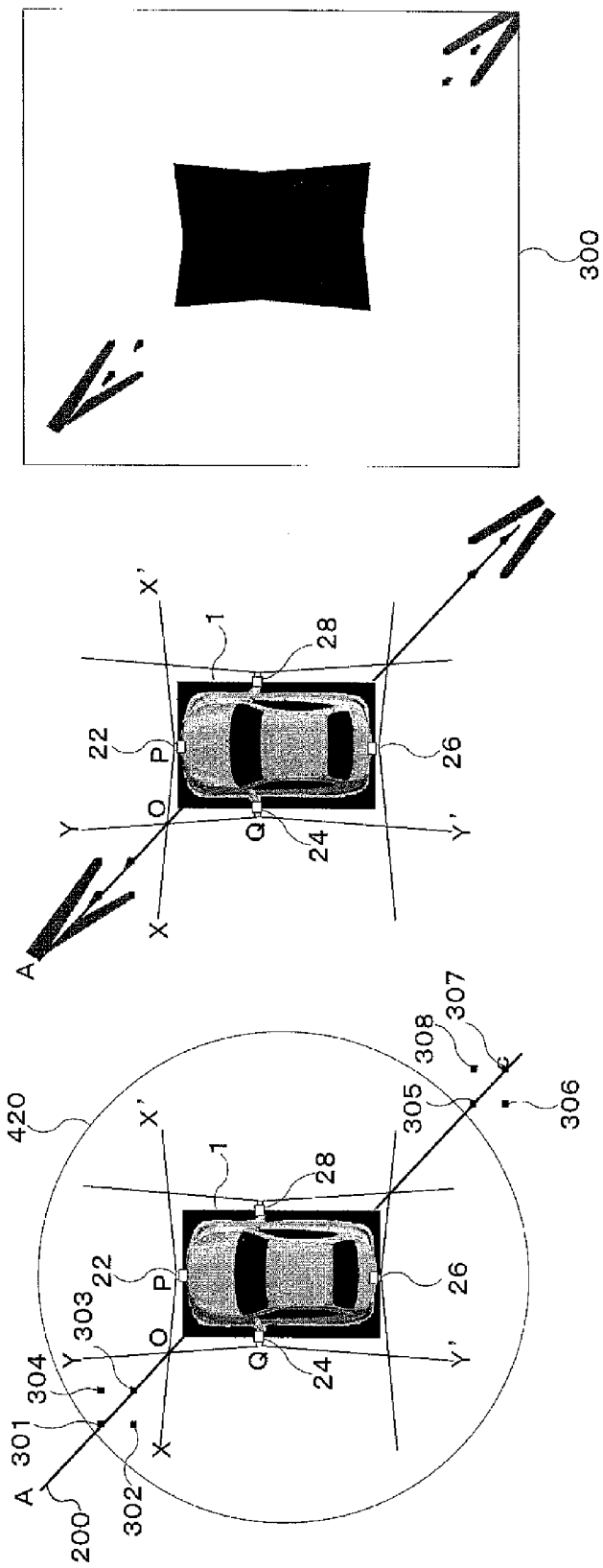

VEHICLE SURROUNDINGS MONITORING DEVICE

TECHNICAL FIELD

The present invention relates to a vehicle surroundings monitoring device, which is installed in a vehicle and which displays a captured image of the surroundings of the vehicle. More specifically, the present invention relates to a vehicle surroundings monitoring device capable of accurately displaying an existence of an obstacle when the obstacle exists in the surroundings of the vehicle.

BACKGROUND ART

In recent years, a system has become common in which a camera is installed in a vehicle to capture and display an image of the surroundings of the vehicle that are likely to be blind spots for a driver.

Particularly, the following system is also recently put to use. In the system, multiple cameras are installed in a vehicle. The system performs coordinate conversion to generate bird's eye view images that are as if the vehicle is overlooked from directly above. Furthermore, the system synthesizes the generated bird's eye view images and thereby displays an image of a 360° view of the surroundings of the vehicle.

Among such systems, for example, an invention is proposed in which the positions of seams of bird's eye view images are set based on the behavior of a vehicle when the images are to be synthesized (Patent Document 1).

Patent Document Japanese Patent Application Publication No. 2007-036668

SUMMARY OF INVENTION

In the invention disclosed in Patent Document 1, an object having a height is imaged by performing conversion for projection onto a road surface. Thus, the object having the height is distorted in a converted image and the three-dimensional object is less recognizable.

Moreover, assume a case where a thin columnar object (three-dimensional object) is standing upright exactly at a position in a seam of images captured by different cameras and the captured images are subjected to the conversion for projection onto the road surface. In each of the images, the columnar object is converted as if to fall down away from corresponding one of the cameras in a direction of a line connecting the columnar object and a principle point of the corresponding camera capturing the columnar object. Thus, when the images are synthesized at the position of the seam, a portion of a converted figure of the columnar object that is falling down beyond the position of the seam is cut away. As a result, the converted figure of the columnar objected at the seam of the images has only a portion in contact with the road surface remaining. In other words, the synthesized bird's eye view images have a blind spot occurring for an object having a height from the road surface in the seam of the bird's eye view images.

Therefore, one or more embodiments of the present invention provide a vehicle surroundings monitoring device capable of accurately displaying a three-dimensional object having a height from a road surface without distortion, while avoiding occurrence of a blind spot also in a seam of images.

A vehicle surroundings monitoring device according to one or more embodiments of the present invention is a device in which: a virtual-screen setup unit sets up a virtual screen extending in a direction from a near side to a far side of a vehicle, in an overlapping region of the multiple image capturing units attached in a periphery of the vehicle and disposed in such a way that image capturing ranges respectively of adjacent image capturing units partially overlap each other; a virtual-screen projection image generation unit projects the images captured respectively by the adjacent image capturing units on the virtual screen; a first viewpoint conversion unit performs coordinate conversion in which the virtual-screen projection image is converted into an image of observation from a predetermined viewpoint position in a predetermined sight-line direction; and an image display unit displays the image subjected to the coordinate conversion.

Specifically, a first vehicle surroundings monitoring device according to one or more embodiments of the present invention includes: multiple image capturing units installed in a vehicle to capture images of surroundings of the vehicle such that adjacent image capturing ranges of the image capturing units partially have an overlapping region; a virtual-screen setup unit configured to set up a virtual screen in the overlapping region of the image capturing ranges, the virtual screen extending in a direction from a near side to a far side of the vehicle and standing upright from a road surface in a vertical direction; a virtual-screen projection image generation unit configured to store a value corresponding to a gray value stored in each of pixels of the image captured by each of the adjacent image capturing units, at a position where a half line intersects the virtual screen, the half line extending from a position corresponding to a principle point of each image capturing unit toward each pixel of the image captured by each image capturing unit; a first viewpoint conversion unit configured to perform coordinate conversion in which an image generated by the virtual-screen projection image generation unit is converted to an image of observation from a predetermined viewpoint position in a predetermined sight-line direction and to output the converted image; and an image display unit configured to display the converted image outputted from the first viewpoint conversion unit.

In the first vehicle surroundings monitoring device according to one or more embodiments of the present invention: the virtual-screen setup unit sets up the virtual screen extending in the direction from the near side to the far side of the vehicle the overlapping region of the image capturing ranges respectively of the adjacent image capturing units; the virtual-screen projection image generation unit generates the virtual-screen projection image by projecting the values corresponding to gray values of image captured each of the adjacent image capturing units on the virtual screen; and the image display unit displays the thus-generated virtual-screen projection image. This enables a three-dimensional object having a height from the road surface to be accurately displayed without distortion while avoiding occurrence of a blind spot even in a seam of images.

Moreover, a second vehicle surroundings monitoring device according to one or more embodiments of the present invention includes: multiple image capturing units installed in a vehicle to capture images of surroundings of the vehicle such the image capturing ranges of the adjacent image capturing units partially have an overlapping region; a virtual-screen setup unit configured to set up a virtual screen in the overlapping region of the image capturing ranges, the virtual screen extending in a direction from a near side to a far side of the vehicle and standing upright from a road surface in a vertical direction; a virtual-screen projection image generation unit configured to store a value corresponding to a gray value stored in each of pixels of the image captured by each of adjacent ones of the image capturing units, at a position where a half line intersects the virtual screen, the half line extending from a position corresponding to a principle point of the each image capturing unit toward each pixel of the image captured by each image capturing unit; a first viewpoint conversion unit configured to perform coordinate conversion in which an image generated by the virtual-screen projection image generation unit is converted to an image of observation from a predetermined viewpoint position in a predetermined sight-line direction and to output the converted image; a road-surface projection image generation unit configured to store the gray value stored in each pixel of the image captured by each of the plurality of image capturing units, at a position where a half line intersects the road surface, the half line extending from a position corresponding to a principle point of the each image capturing unit toward the each pixel of the image captured by the each image capturing unit; a second viewpoint conversion unit configured to perform coordinate conversion in which an image generated by the road-surface projection image generation unit is converted to an image of observation from the predetermined viewpoint position in the predetermined sight-line direction and to output the converted image; an image synthesis unit configured to synthesize the converted image outputted from the first viewpoint conversion unit and the converted image outputted from the second viewpoint conversion unit into one image and to output the one image; and an image display unit configured to display the one image outputted from the image synthesis unit.

In the second vehicle surroundings monitoring device according to one or more embodiments of the present invention: the virtual-screen setup unit sets up the virtual screen extending in the direction from the near side to the far side of the vehicle in the overlapping region of the image capturing ranges of the respective adjacent image capturing units; the virtual-screen projection image generation unit generates the virtual-screen projection image by projecting values corresponding to gray values of the image captured by each of the adjacent image capturing units on the virtual screen; the road-surface projection image generation unit generates the road-surface projection image by projecting the gray values stored in the respective pixels of the image captured by each image capturing unit on the road surface; the image synthesis unit synthesizes the virtual-screen projection image and the road-surface projection image generated as described above into one image; and the image display unit displays the image. This allows not only a three-dimensional object in a border portion of the adjacent image capturing ranges but also a three-dimensional object existing in the surroundings of the vehicle to be accurately displayed.

The vehicle surroundings monitoring device according to one or more embodiments of the present invention can accurately display a three-dimensional object having a height from the road surface which exists at the seam of the images captured by the multiple image capturing units installed in the periphery of the vehicle. Thus, the vehicle surroundings monitoring device according to one or more embodiments of the present invention has such an effect that a parking operation and a turning operation of the vehicle can be smoothly performed with a help of the displayed image.

BRIEF DESCRIPTION OF THE DRAWINGS

FIG. 4A is a view explaining how an image captured by a first camera is projected on a first virtual screen.

FIG. 4B is a view explaining how an image captured by a second camera is projected on the first virtual screen.

FIG. 4C is a view showing a first virtual-screen projection image.

FIG. 13A is an arrangement drawing of a virtually-set vehicle surroundings environment.

FIG. 13B is a view explaining how four images captured by a first camera to a fourth camera are converted are respectively converted into road-surface projection images and synthesized.

FIG. 13C is a view showing a synthesized road-surface projection image.

DETAILED DESCRIPTION OF INVENTION

Embodiments of a vehicle surroundings monitoring device of the present invention are described below with reference to the drawings.

Embodiment 1

Embodiment 1 is one in which the present invention is applied to a vehicle surroundings monitoring device 2 capable of displaying images of surroundings of a vehicle, which are captured with multiple cameras installed in the vehicle, in a mode easily viewable by a driver.

Figure 1:
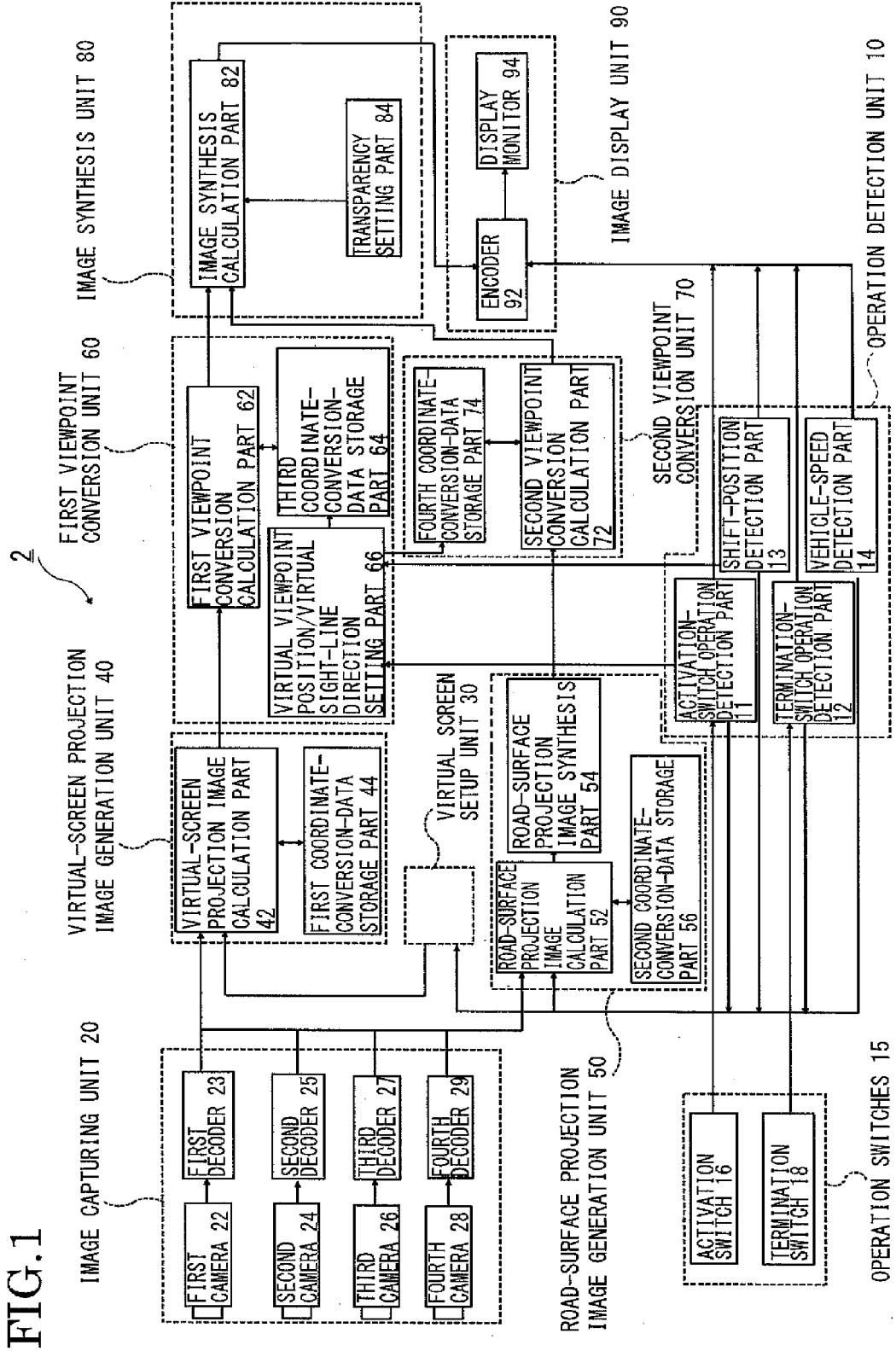
FIG. 1 is a block diagram showing a schematic configuration of a vehicle surroundings monitoring device of Embodiment 1 of the present invention.

FIG. 1 is a block diagram showing a configuration of the vehicle surroundings monitoring device 2 of Embodiment 1 of the present invention. As shown in FIG. 1, the vehicle surroundings monitoring device 2 of Embodiment 1 is installed in a vehicle 1 not illustrated and includes an operation detection unit 10, operation switches 15, an image capturing unit 20, a virtual-screen setup unit 30, a virtual-screen projection image generation unit 40, a road-surface projection image generation unit 50, a first viewpoint conversion unit 60, a second viewpoint conversion unit 70, an image synthesis unit 80, and an image display unit 90. The operation detection unit 10 detects an activation operation and a termination operation of the vehicle surroundings monitoring device 2 performed by the driver. The operation switches 15 are installed at positions within the reach of the driver and are used to instruct the activation and termination of the vehicle surroundings monitoring device 2. The image capturing unit 20 includes multiple cameras capturing images of the surroundings of the vehicle. The virtual-screen setup unit 30 sets up a virtual screen in an overlapping portion of image capturing regions of each adjacent two of the multiple cameras included in the image capturing unit 20. The virtual-screen projection image generation unit 40 projects images respectively captured by the adjacent cameras on the virtual screens set up by the virtual-screen setup unit 30 and thereby generates virtual-screen projection images. The road-surface projection image generation unit 50 projects the captured images of the surroundings of the vehicle on the road surface and thereby generates road-surface projection images. The first viewpoint conversion unit 60 converts the virtual-screen projection images generated by the virtual-screen projection image generation unit 40 respectively to images of observation from a predetermined virtual viewpoint in a predetermined virtual sight-line direction. The second viewpoint conversion unit 70 converts the road-surface projection image generated by the road-surface projection image generation unit 50 to an image of observation from the predetermined virtual viewpoint in the predetermined virtual sight-line direction. The image synthesis unit 80 synthesizes the virtual-screen projection images subjected to the viewpoint conversion by the first viewpoint conversion unit 60 and the road-surface projection image subjected to the viewpoint conversion by the second viewpoint conversion unit 70 into one image. The image display unit 90 displays the image synthesized by the image synthesis unit 80.

More specifically, the operation detection unit 10 includes an activation-switch operation detection part 11 detecting the activation operation performed by the driver, a termination-switch operation detection part 12 detecting the termination operation performed by the driver, a shift-position detection part 13 detecting a shift position of the vehicle, and a vehicle-speed detection part 14 detecting a vehicle speed.

More specifically, the operation switches 15 includes an activation switch 16 used to give an instruction to activate the vehicle surroundings monitoring device 2 and a termination switch 18 used to give an instruction to terminate the vehicle surroundings monitoring device 2.

Figure 2A:
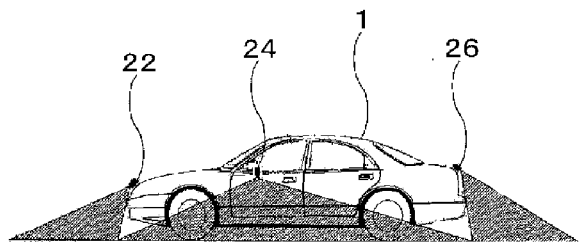
FIG. 2A is a left view of a vehicle in which Embodiment 1 of the present invention is installed.
Figure 2B:
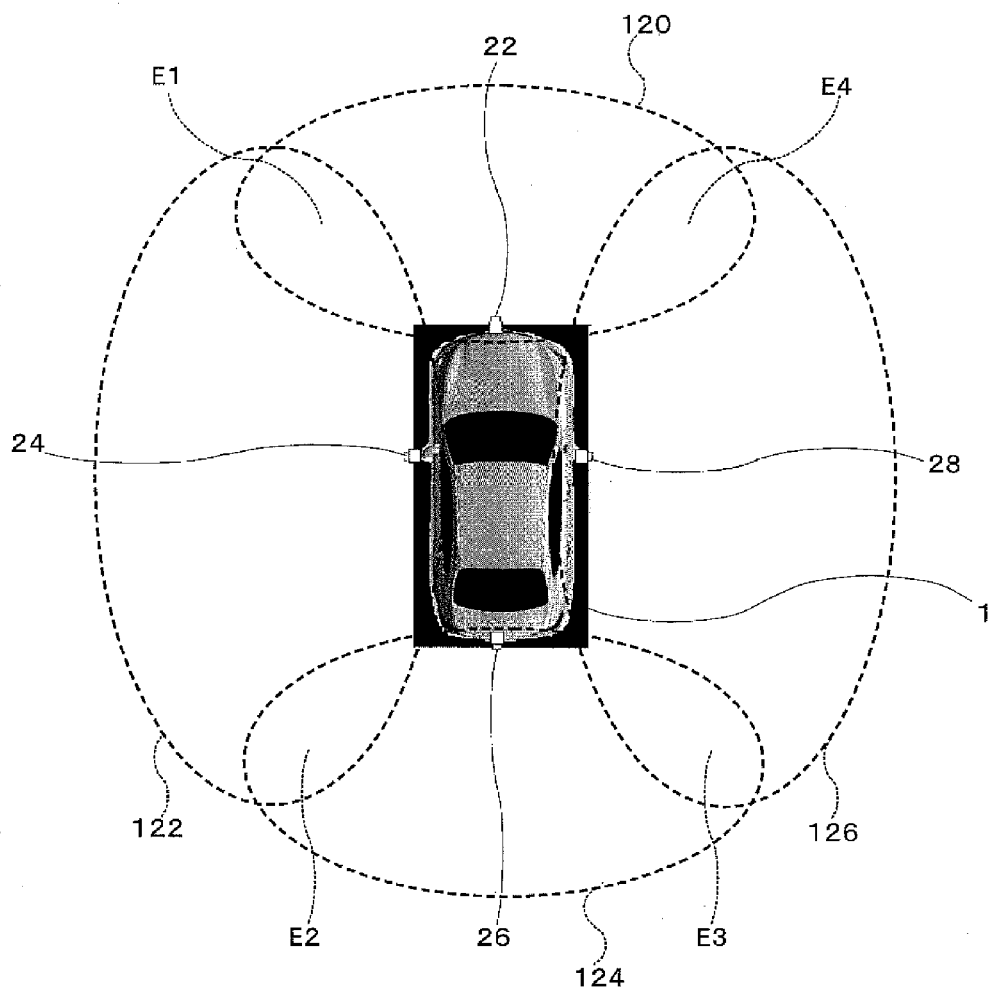
FIG. 2B is a top view of the vehicle in which Embodiment 1 of the present invention is installed.

More specifically, the image capturing unit 20 is installed in the periphery of the vehicle as shown in FIGS. 2A, 2B, and includes a first camera 22, a second camera 24, a third camera 26, a fourth camera 28, a first decoder 23 converting an output signal of the first camera 22 to a digital signal by performing AD conversion, a second decoder 25 converting an output signal of the second camera 24 to a digital signal by performing AD conversion, a third decoder 27 converting an output signal of the third camera 26 to a digital signal by performing AD conversion, and a fourth decoder 29 converting an output signal of the fourth camera 28 to a digital signal by performing AD conversion. The first camera 22 to the fourth camera 28 are disposed with the image capturing ranges of each adjacent two of the cameras overlapping each other.

More specifically, the virtual-screen projection image generation unit 40 includes a first coordinate-conversion-data storage part 44 and a virtual-screen projection image calculation part 42. The first coordinate-conversion-data storage part 44 stores a coordinate conversion data table created in advance based on the installed positions respectively of the first camera 22 to the fourth camera 28 and the installed positions respectively of the virtual screens to generate the virtual-screen projection images. The virtual-screen projection image calculation part 42 generates the virtual-screen projection images on the basis of the coordinate conversion data table stored in the first coordinate-conversion-data storage part 44.

More specifically, the road-surface projection image generation unit 50 includes a second coordinate-conversion-data storage part 56, a road-surface projection image calculation part 52 and a road-surface projection image synthesis part 54. The second coordinate-conversion-data storage part 56 stores a coordinate conversion data table created in advance based on the installed positions respectively of the first camera 22 to the fourth camera 28 to generate the road-surface projection images. The road-surface projection image calculation part 52 generates the road-surface projection images from the images captured by the respective cameras on the basis of the coordinate conversion data table stored in the second coordinate-conversion-data storage part 56. The road-surface projection image synthesis part 54 synthesizes multiple generated road-surface projection images into one image.

More specifically, the first viewpoint conversion unit 60 includes a virtual viewpoint position/virtual sight-line direction setting part 66, a third coordinate-conversion-data storage part 64, and a first viewpoint conversion calculation part 62. The virtual viewpoint position/virtual sight-line direction setting part 66 sets the virtual viewpoint position and the virtual sight-line direction used to generate a synthesized image of the virtual-screen projection images and the road-surface projection image, on the basis of a traveling direction of the vehicle 1 and the switch operation by the driver. The third coordinate-conversion-data storage part 64 stores a coordinate conversion data table used to perform the viewpoint conversion of the virtual-screen projection images in which the images are converted to an image of observation from the virtual viewpoint position in the virtual sight-line direction, the virtual viewpoint position and the virtual sight-line direction set by the virtual viewpoint position/virtual sight-line direction setting part 66. The first viewpoint conversion calculation part 62 performs the viewpoint conversion of the virtual-screen projection images on the basis of the coordinate conversion data table stored in the third coordinate-conversion-data storage part 64.

More specifically, the second viewpoint conversion unit 70 includes a fourth coordinate-conversion-data storage part 74 and a second viewpoint conversion calculation part 72. The fourth coordinate-conversion-data storage part 74 stores a coordinate conversion data table used to perform the viewpoint conversion of the road-surface projection image in which the image is converted an image of observation from the virtual viewpoint position in the virtual sight-line direction, the virtual viewpoint position and the virtual sight-line direction set by the virtual viewpoint position/virtual sight-line direction setting part 66. The second viewpoint conversion calculation part 72 performs the viewpoint conversion of the road-surface projection image on the basis of the coordinate conversion data table stored in the fourth coordinate-conversion-data storage part 74.

More specifically, the image synthesis unit 80 includes a transparency setting part 84 and an image synthesis calculation part 82. The transparency setting part 84 sets a transparency of portions where the images overlap each other when the virtual-screen projection images subjected to the viewpoint conversion by the first viewpoint conversion unit 60 and the road-surface projection image subjected to the viewpoint conversion by the second viewpoint conversion unit 70 are synthesized into one image. The image synthesis calculation part 82 synthesizes the virtual-screen projection images subjected to the viewpoint conversion by the first viewpoint conversion unit 60 and the road-surface projection image subjected to the viewpoint conversion by the second viewpoint conversion unit 70 at the transparency set by the transparency setting part 84, with the virtual-screen projection images in the foreground and the road-surface projection image in the background.

More specifically, the image display unit 90 includes: an encoder 92 that converts a digital signal of the image synthesized by the image synthesis unit 80 to an analog signal; and a display monitor 94 such as a liquid crystal monitor, which is installed in a vehicle interior and which displays the image converted to the analog signal by the encoder 92.

Figure 5:
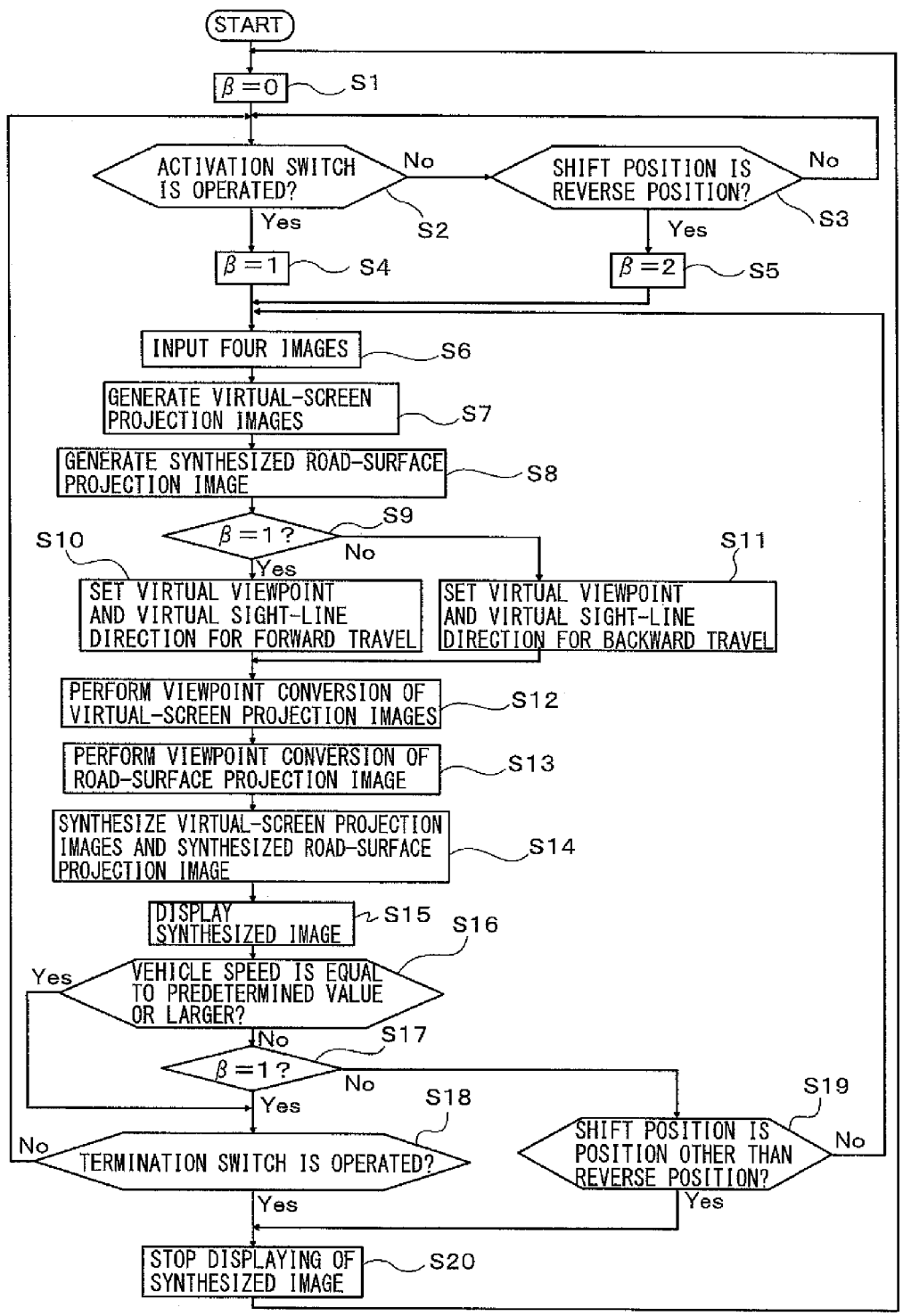
FIG. 5 is a flowchart for explaining an operation of Embodiment 1 of the present invention.

Next, an action of the vehicle surroundings monitoring device 2 of Embodiment 1 is described based on a flowchart of FIG. 5. The vehicle surroundings monitoring device 2 of Embodiment 1 is used when the vehicle is parked or turned in a small space, and assists the driving operation by presenting the images of the surroundings of the vehicle to the driver.

As shown in FIG. 2A, the first camera 22, the second camera 24, and the third camera 26 are installed respectively in a front bumper of the vehicle 1, a left door mirror of the vehicle 1, and a rear bumper of the vehicle 1. Although not illustrated in FIG. 2A, the fourth camera 28 is installed in a right door mirror of the vehicle 1.

Moreover, as shown in FIG. 2B, the cameras are installed to capture images of regions where the image capturing ranges thereof intersect with the road surface at intersection lines 120, 122, 124, and 126, respectively.

As shown in FIG. 2B, a set of the adjacent cameras 22 and 24, a set of adjacent cameras 24 and 26, a set of adjacent cameras 26 and 28, and a set of adjacent cameras 28 and 22 are installed with the image capturing ranges of the cameras overlapping each other to have a first overlapping region E1, a second overlapping region E2, a third overlapping region E3, and a fourth overlapping region E4.

First, a description is given of an operation of the vehicle surroundings monitoring device 2 of Embodiment 1 in a situation where the vehicle 1 is traveling forward to park. When monitoring images of surroundings of the vehicle, the driver operates the activation switch 16 provided in the vehicle interior. Then, the activation switch operation is detected by the activation-switch operation detection part 11 (S2 of FIG. 5) and 1 is given to a variable 6 indicating the state of the vehicle surroundings monitoring device 2 (S4 of FIG. 5).

The images captured by the first camera 22 to the fourth camera 28 are sampled and quantized respectively by the first decoder 23 to the fourth decoder 29 and are thereby converted into digital images (S6 of FIG. 5). Here, the images captured by the first camera 22 to the fourth camera 28 are respectively referred to as $I_1(x, y)$, $I_2(x, y)$, $I_3(x, y)$, and $I_4(x, y)$.

Next, the virtual-screen setup unit 30 sets up planar virtual screens 200, 210, 220, and 230 being orthogonal to the road surface and each extending in a direction from the near side to the far side of the vehicle in corresponding one of the overlapping regions E1, E2, E3, and E4 of the image capturing ranges of the cameras installed adjacently, with the virtual screens 200, 210, 220, and 230 bisecting the areas of the overlapping regions E1, E2, E3, and E4, respectively.

Figure 3:
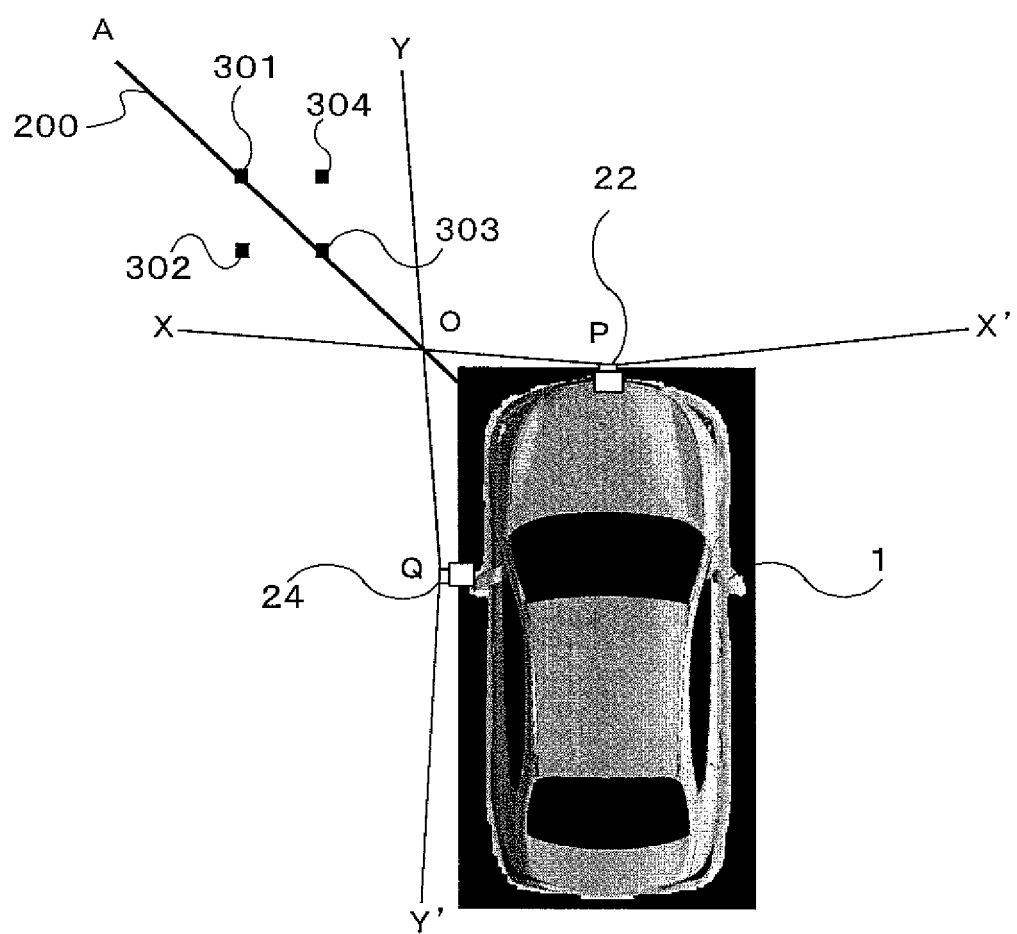
FIG. 3 is an arrangement drawing of a virtually-set vehicle surroundings environment.

FIG. 3 only shows the position where the virtual screen 200 is set up. In FIG. 3, the virtual screen 200 is set up to satisfy <XOA=>YOA.

Although not illustrated, the virtual screens 210, 220, and 230 are each set up in a positional relationship similar to that of the virtual screen 200.

Then, the virtual-screen projection image generation unit 40 performs conversion of the image $I_1(x, y)$ and the image $I_2(x, y)$ for projection onto the first virtual screen 200 set up in the first overlapping region E1, performs conversion of the image $I_2(x, y)$ and the image $I_3(x, y)$ for projection onto the second virtual screen 210 set up in the second overlapping region E2, performs conversion of the image $I_3(x, y)$ and the image $I_4(x, y)$ for projection onto the third virtual screen 220 set up in the third overlapping region E3, and performs conversion of the image $I_4(x, y)$ and the image $I_1(x, y)$ for projection onto the fourth virtual screen 230 set up in the fourth overlapping region E4 (S7 of FIG. 5).

The conversion for projection onto the first virtual screen 200 is described based on FIGS. 3-4C. FIG. 3 shows a state where there are the vehicle 1 and four thin columnar object (first columnar object 301, second columnar object 302, third columnar object 303, fourth columnar object 304) which stands orthogonal to the road surface in an area to the left front of the vehicle 1 and which are disposed respectively at the positions of the four corners of a square.

A description is given only of the image capturing ranges of the first camera 22 and the second camera 24 to simplify the description. However, the image capturing ranges of the other cameras are set in a similar manner. Moreover, the cameras 22 and 24 are each installed facing a horizontal direction. The first camera 22 is assumed to capture an image within a range of <XPX' and the second camera 24 is assumed capture an image within a range of <YQY'. Furthermore, it is assumed that the vehicle 1 is on a level road surface.

The planar first virtual screen 200 orthogonal to the road surface is set up at such a position to bisect <XOY. Here, it is assumed that the first columnar object 301 and the third columnar object 303 stand at positions overlapping the first virtual screen 200.

The virtual-screen projection image generation unit 40 projects gray values of the image $I_1(x, y)$ captured by the first camera 22 on the first virtual screen 200 as shown in FIG. 4A, and also projects gray values of the image $I_2(x, y)$ captured by the second camera 24 on the first virtual screen 200 as shown in FIG. 4B.

The conversion for projection onto the virtual screen is a method in which values corresponding to gray values of the captured image are stored at corresponding positions on the virtual screen, supposing that a figure actually captured by the camera is a figure of an object originally existing on the virtual screen.

Specifically, the conversion for projection is executed as described below. In FIG. 4A, the focus is given on a pixel ($x_0$, $y_0$) forming a figure of the second columnar object 302 in the image $I_1(x, y)$. The gray value $I_1(x_0, y_0)$ stored in the pixel ($x_0$, $y_0$) is assumed to be projected on a point where a half line extending from a principal point P of the first camera 22 shown in FIG. 4A toward the pixel ($x_0$, $y_0$) forming the figure of the second columnar object 302 on which the focus is given intersects the first virtual screen 200, and the value corresponding to the gray value $I_1(x_0, y_0)$ is stored at the point of intersection.

In FIG. 4A, the figure of the second columnar object 302 is projected in a section between a point M and a point N. Thus, the value corresponding to the gray value of the figure of the second columnar object 302 is stored in the region between the point M and the point N on the first virtual screen 200, and a virtual-screen projection FIG. 302P of the second columnar object 302 is generated.

A similar process is performed for all of the pixels in the image $I_1(x, y)$. Thus, a virtual-screen projection FIG. 301P of the first columnar object 301, a virtual-screen projection FIG. 303P of the third columnar object 303, and a virtual-screen projection FIG. 304P of the fourth columnar object 304 are generated on the first virtual screen 200 (see FIG. 4A).

When a similar process is performed for the image $I_2(x, y)$ captured by the second camera 24, a virtual-screen projection FIG. 301Q of the first columnar object 301, a virtual-screen projection FIG. 302Q of the second columnar object 302, a virtual-screen projection FIG. 303Q of the third columnar object 303, and a virtual-screen projection FIG. 304Q of the fourth columnar object 304 are generated on the first virtual screen 200 (see FIG. 4B).

The virtual-screen projection figures generated as described above are additively synthesized and a first virtual-screen projection image 205 shown in FIG. 4C is thereby generated. Note that there is a possibility of the value stored in each pixel exceeding a value corresponding to the quantifying bit number storable in the first virtual-screen projection image 205 when the additive synthesis is simply performed. Thus, it is assumed that the gray values of the image $I_1(x, y)$ and the gray values of the image $I_2(x, y)$ are multiplied by ½ and then added together.

Because it is assumed that the four columnar objects 301, 302, 303, and 304 are standing orthogonal to the road surface and that the first camera 22 and the second camera 24 are installed in the horizontal directions to simplify the description, as shown in FIG. 4C, the virtual-screen projection figures of the respective columnar objects 301, 302, 303, and 304 are generated on the first virtual screen 200 in band shapes extending in a vertical direction of the screen.

When the positional relationship among the four columnar objects 301, 302, 303, and 304 and the vehicle 1 is as shown in FIG. 3, the four columnar objects 301, 302, 303, and 304 are projected on the first virtual screen 200 by being captured by both of the first camera 22 and the second camera 24. Here, four virtual-screen projection figures are generated in a view from the first camera 22 as shown in FIG. 4A and four virtual-screen projection figures are generated in a view from the second camera 24 as shown in FIG. 4B.

When these virtual-screen projection images are additively synthesized, overlapping of the virtual-screen projection figures occurs. Thus, five virtual-screen projection figures are generated as shown in FIG. 4C. Among the five virtual-screen projection figures shown in FIG. 4C, the leftmost one corresponds to the virtual-screen projection FIG. 304P, the second left one corresponds to the virtual-screen projection FIG. 302Q, the third left one corresponds to the virtual-screen projection FIGS. 301P and 301Q, the fourth left one corresponds to the virtual-screen projection FIGS. 303P and 303Q, and the rightmost one corresponds to the virtual-screen projection FIGS. 302P and 304Q.

As a matter of course, the number of virtual-screen projection figures depends on the relationship between the standing positions of the columnar objects and the position of the virtual screen.

A process of conversion for projection onto the virtual screen is performed in the virtual-screen projection image calculation part 42. However, a computing load is large when the intersection point with the first virtual screen 200 is calculated for each of the pixels in the image $I_1(x, y)$ and the image $I_2(x, y)$. Thus, a coordinate value of each of the image $I_1(x, y)$ and the image $I_2(x, y)$ for projection onto a certain pixel in the first virtual-screen projection image 205 are obtained in advance through calculation on the basis of the arrangement of the first camera 22 and the second camera 24. Then, a coordinate conversion table is created in advance based on the calculation result and is stored in the first coordinate-conversion-data storage part 44.

In the virtual-screen projection image calculation part 42, the computing load is reduced by executing the conversion for projection by performing substitution of the coordinates on the basis of the coordinate conversion table stored in the first coordinate-conversion-data storage part 44.

Similar conversion for projection is executed for the second virtual screen 210 set up in the second overlapping region E2, the third virtual screen 220 set up in the third overlapping region E3, and the fourth virtual screen 230 set up in the fourth overlapping region E4 of FIG. 2B. As a result, four virtual-screen projection images (first virtual-screen projection image 205, second virtual-screen projection image 215, third virtual-screen projection image 225, and fourth virtual-screen projection image 235) are generated.

Next, the image $I_1(x, y)$, the image $I_2(x, y)$, the image $I_3(x, y)$, and the image $I_4(x, y)$ are projected on the road surface by the road-surface projection image calculation part 52 and are converted into images overlooking the vehicle from a position directly above the vehicle (S8 of FIG. 5).

The virtual-screen projection images described above are images generated under the assumption that the images captured by the cameras include the figures of the objects existing on the virtual screens. Meanwhile, the road-surface projection images are images generated under the assumption the images captured by the cameras include the figures of the objects exiting on the road surface.

The generation of the road projection images is performed in the road-surface projection image calculation part 52. Specifically, in the case of the image $I_1(x, y)$, the generation of the road projection image is performed by obtaining points where half lines extending from the principal point P of the first camera 22 respectively toward the pixels in the first image $I_1(x, y)$ captured by the first camera 22 intersect the road surface. The road-surface projection image is generated in a similar way for the image $I_2(x, y)$.

Here, a computing load is large when the intersection point with the road surface is calculated for each of the pixels in the image $I_1(x, y)$ and the image $I_2(x, y)$. Thus, a coordinate value of each of the image $I_1(x, y)$ and the image $I_2(x, y)$ for projection onto a certain point on the road surface is obtained in advance through calculation on the basis of the arrangement of the first camera 22 and the second camera 24. Then, a coordinate conversion table is created in advance based on the calculation result and is stored in the second coordinate-conversion-data storage part 56.

In the road-surface projection image calculation part 52, the computing load is reduced by executing the conversion for projection by performing substitution of the coordinates on the basis of the coordinate conversion table stored in the second coordinate-conversion-data storage part 56.

Figure 6A:
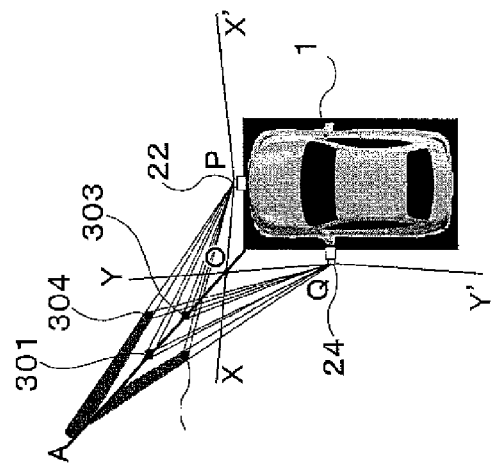
FIG. 6A is a view explaining how the image captured by the first camera is projected on a road surface.
Figure 6B:
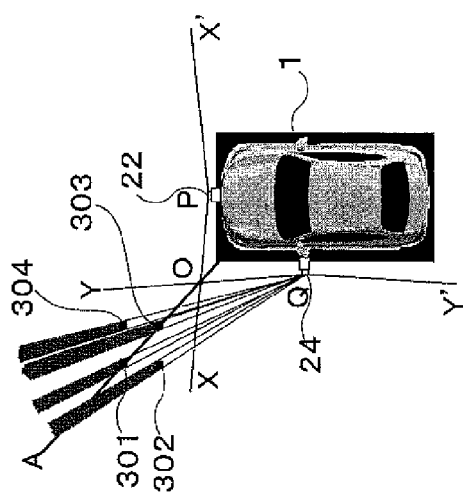
FIG. 6B is a view explaining how the image captured by the second camera is projected on the road surface.
Figure 6C:
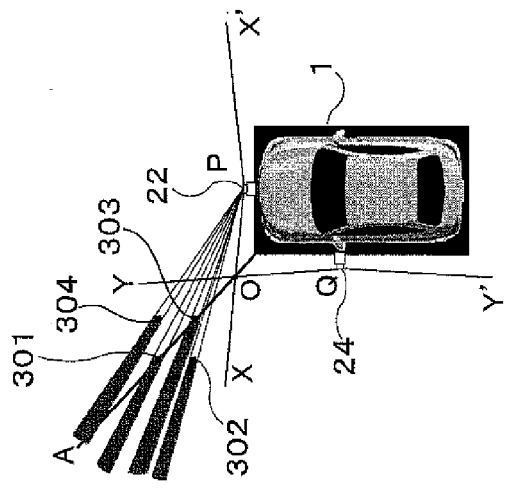
FIG. 6C is a view explaining how the image captured by the first camera and the image captured by the second camera are projected on the road surface and synthesized.

FIGS. 6A-6C show how the image $I_1(x, y)$ captured by the first camera 22 and the image $I_2(x, y)$ captured by the second camera 24 are converted to the road-surface projection images in the arrangement shown in FIG. 3.

As shown in FIG. 6A, the first columnar object 301, the second columnar object 302, the third columnar object 303, and the fourth columnar object 304 in the image $I_1(x, y)$ captured by the first camera 22 are converted in the road-surface projection image in such a manner as if each of the columnar objects has fallen down away from the first camera 22 in a direction of a line connecting the principal point P of the first camera 22 and the columnar object.

Moreover, as shown in FIG. 6B, the first columnar object 301 to the fourth columnar object 304 in the image $I_2(x, y)$ captured by the first camera 22 are converted in the road-surface projection image in such a manner as if each of the columnar objects has fallen down to be away from the second camera 24 in a direction of a line connecting the principal point Q of the second camera 24 and the columnar object.

Next, in the road-surface projection image synthesis part 54, the road-surface projection images respectively converted from the image $I_1(x, y)$, the image $I_2(x, y)$, the image $I_3(x, y)$, and the image $I_4(x, y)$ are synthesized into one image.

The method of synthesizing the road-surface projection images is described with reference to FIG. 6C. The road-surface projection image of the image $I_1(x, y)$ and the road-surface projection image of the image $I_2(x, y)$ are synthesized by using, as a border line, a straight line AO bisecting the overlapping region of the image capturing range of the first camera 22 and the image capturing range of the second camera 24. Specifically, figures projected in a manner crossing the straight line AO in the road-surface projection images shown in FIGS. 6A and 6B are not reflected in the synthesized image. By synthesizing the road-surface projection images in a way described above, the road-surface projection image of the first camera 22 and the road-surface projection image of the second camera 24 are synthesized as shown in FIG. 6C.

As is apparent from FIG. 6C, the road-surface projection images of the first columnar object 301 and the third columnar object 303 existing on the straight line AO being a seam of the road-surface projection images disappear with only the portions where the columnar objects are in contact with the road surface left.

Figure 7A:
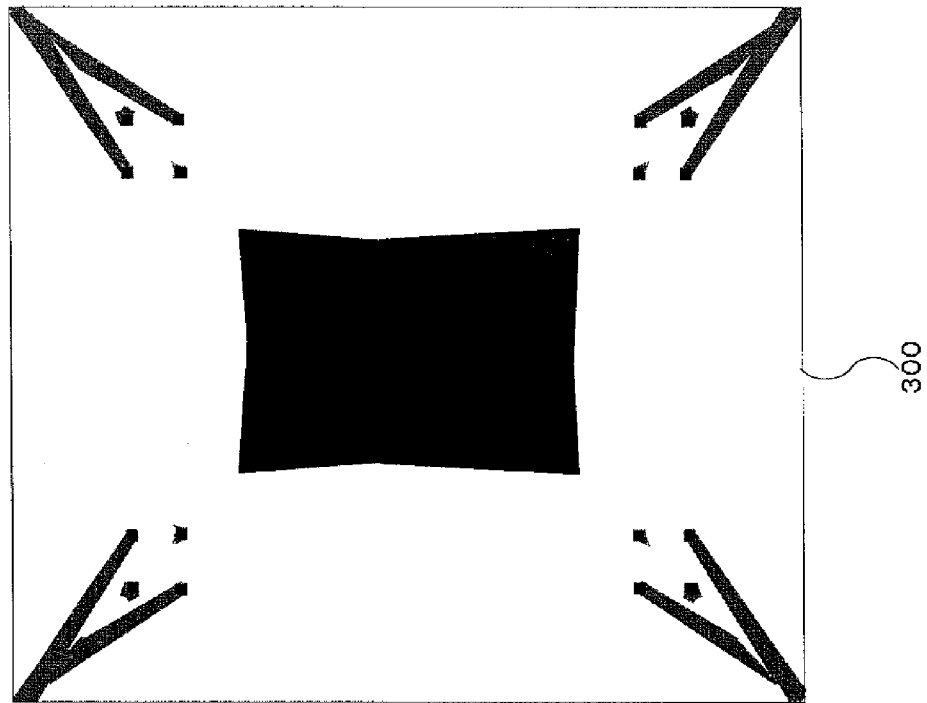
FIG. 7A is a view explaining how the images captured respectively by the first camera to a fourth camera are projected on the road surface and synthesized.

Here, when it is assumed that four narrow columnar objects stand in each of a left rear corner portion, a right rear corner portion, and a right front corner portion of the vehicle 1 as in a similar arrangement as those in the left front corner portion, the road-surface projection images of the four images captured by the four cameras are synthesized as shown in FIG. 7A.

Figure 7B:
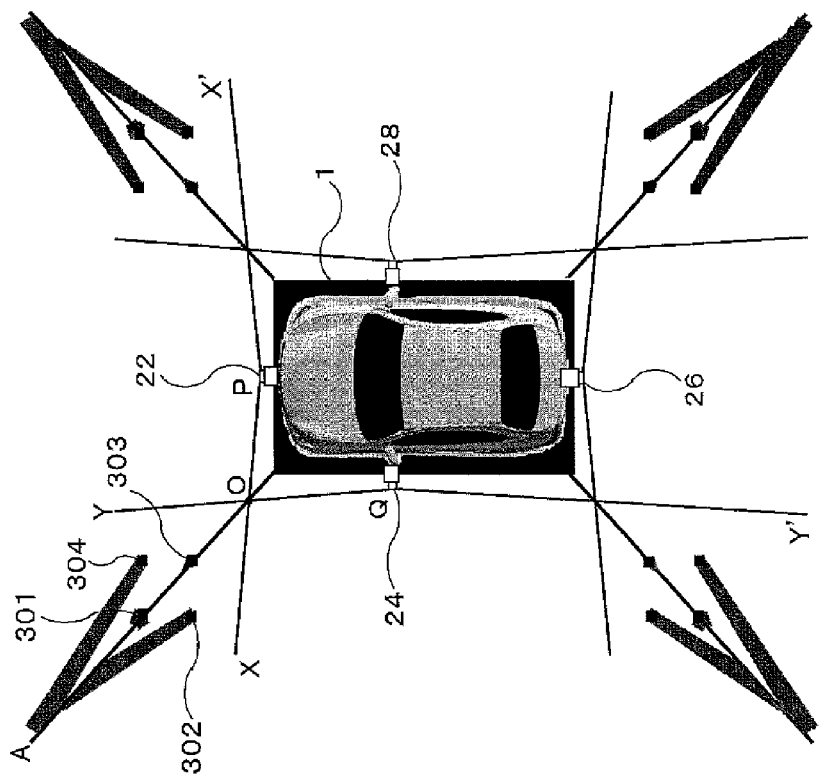
FIG. 7B is a view showing a synthesized road-surface projection image.

Here, because the vehicle 1 and portions close thereto are outside the fields of view of the cameras, a unique value is stored to notify the driver that the information is missing. For example, the gray value is substituted with the minimum value or the maximum value. Thus, a synthesized road-surface projection image 300 shown in FIG. 7B is generated.

Next, the first viewpoint conversion unit 60 converts the four virtual-screen projection images generated in S7 of FIG. 5 respectively to images of observation from the predetermined viewpoint position in the predetermined sight-line direction.

In this conversion, the predetermined viewpoint position and the predetermined sight-line direction are determined by the virtual viewpoint position/virtual sight-line direction setting part 66 on the basis of information detected by the operation detection unit 10.

Specifically, when 1 is given to the variable 6 indicating the state of the vehicle surroundings monitoring device 2 (S9 of FIG. 5), the virtual viewpoint is set at a position above and rearward of the vehicle 1 and the virtual sight-line direction is set in such a way that an area ahead of the vehicle 1 is overlooked from the virtual viewpoint (S10 of FIG. 5).

The coordinate conversion table for performing the viewpoint conversion of the four virtual-screen projection images in a manner as if observation is performed from the set virtual viewpoint position in the set virtual sight-line direction is stored in the third coordinate-conversion-data storage part 64 in advance, and the first viewpoint conversion calculation part 62 performs the viewpoint conversion on the basis of the coordinate conversion table (S12 of FIG. 5).

Moreover, the second viewpoint conversion unit 70 converts the synthesized road-surface projection image 300 generated in 58 of FIG. 5 to an image of observation from the same viewpoint position in the same sight-line direction as those set by the virtual viewpoint position/virtual sight-line direction setting part 66.

Specifically, the coordinate conversion table for performing the viewpoint conversion of the synthesized road-surface projection image 300 in a manner as if observation is performed from the set virtual viewpoint position in the set virtual sight-line direction is stored in the fourth coordinate-conversion-data storage part 74 in advance, and the second viewpoint conversion calculation part 72 performs the viewpoint conversion on the basis of the coordinate conversion table (S13 of FIG. 5).

Next, the four virtual-screen projection images (first virtual-screen projection image 205, second virtual-screen projection image 215, third virtual-screen projection image 225, and fourth virtual-screen projection image 235) generated by the first viewpoint conversion calculation part 62 and the synthesized road-surface projection image 300 generated by the second viewpoint conversion calculation part 72 are synthesized into one image in the image synthesis unit 80 with the virtual-screen projection images (205, 215, 225, and 235) in the foreground and the synthesized road-surface projection image 300 in the background (S14 of FIG. 5).

The image synthesis is performed by the image synthesis calculation part 82 on the basis of the transparency determined by the transparency setting part 84.

Provided that the first virtual-screen projection image 205 generated by the first viewpoint conversion calculation part 62 is $K(x, y)$, the synthesized road-surface projection image 300 generated by the second viewpoint conversion calculation part 72 is $L(x, y)$, and the image to be synthesized by the image synthesis unit 80 is $M(x, y)$, $M(x, y)$ is calculated by using Formula 1.

$$M(x,y) = \alpha \times K(x,y) + (1-\alpha) \times L(x,y) \quad \text{(Formula 1)}$$

In this formula, $\alpha$ is a transparency parameter. Specifically, $\alpha$ is a value corresponding to the transparency of the image disposed in the foreground when two images overlap each other, and takes a value within a range of $0 \leq \alpha \leq 1$. The value of $\alpha$ is set in advance and is stored in the transparency setting part 84. In Embodiment 1, $\alpha$ is assumed to be set to 1. This is such a setting that, when the virtual-screen projection images (205, 215, 225, and 235) and the synthesized road-surface projection image 300 overlap each other, the synthesized road-surface projection image 300 in the background is made invisible. The value of $\alpha$ is not limited to 1, and can be accurately set based on the usage and the visibility of the synthesized image to be eventually generated.

Figure 8A:
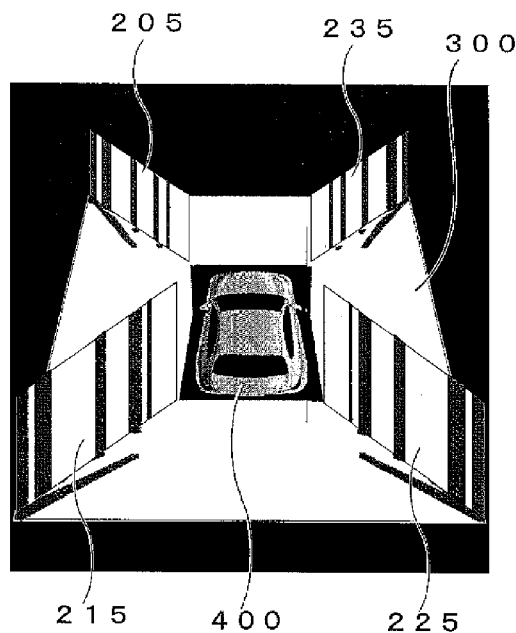
FIG. 8A is an example of an image displayed on a display monitor when the vehicle is travelling forward.

An example of the synthesized image thus obtained is shown in FIG. 8A. In the drawing, regions which are blacked out are regions outside the field of view of the image capturing unit 20 which correspond to the position of the vehicle 1 and the close vicinity of the vehicle 1 and regions other than the virtual-screen projection images and the synthesized road-surface projection image.

As shown in FIG. 8A, at the position of the vehicle 1 among these regions, a first vehicle icon 400 showing its rear may be displayed in a superimposed manner to more clearly show the front-rear positional relationship.

The synthesized image of FIG. 8A obtained as described above is subjected to DA conversion by the encoder 92 and is displayed on the display monitor 94 provided inside the vehicle 1 (S15 of FIG. 5).

At this time, the vehicle speed is constantly detected by the vehicle-speed detection part 14. When the detected vehicle speed exceeds a predetermined value (S16 of FIG. 5), the displayed image is returned to a state before the activation of the vehicle surroundings monitoring device 2 (S20 of FIG. 5) and the process proceeds to a non-display state of the vehicle surroundings monitoring device 2 (S1 of FIG. 5).

Moreover, when the operation of the termination switch 18 is detected in the termination-switch operation detection part 12 (S18 of FIG. 5), the displayed image is returned to the state before the activation of the vehicle surroundings monitoring device 2 (S20 of FIG. 5) and the process proceeds to the non-display state of the vehicle surroundings monitoring device 2 (S1 of FIG. 5).

The description has been given above of the operation in the case where the vehicle 1 is traveling forward. When the vehicle 1 is traveling backward, an image of an area behind the vehicle is displayed. The flow of operation in such a case is almost identical to that in the case where the vehicle is traveling forward, which is described above. Thus, only the different points are described briefly.

When it is detected in the shift-position detection part 13 that the shift position is at a reverse position (S3 of FIG. 5), 2 is stored in the variable 13 indicating the state of a system (S5 of FIG. 5). Then, in the virtual viewpoint position/virtual sight-line direction setting part 66, the virtual viewpoint is set at a position forward and above the vehicle 1 and the virtual sight-line direction is set in such a way that an area behind the vehicle 1 is overlooked from the virtual viewpoint (S11 of FIG. 5).

The virtual-screen projection images and the synthesized road-surface projection image 300 generated in a way similar to the case where the vehicle is traveling forward are synthesized by the image synthesis calculation part 82 and, as shown in part (b) of FIG. 8, the synthesized image is displayed on the display monitor 94 as an image overlooking the area behind the vehicle (S15 of FIG. 5). At this time, a second vehicle icon 410 showing its, front may be displayed at the position of the vehicle 1 in a superimposed manner to more clearly show the front-rear positional relationship.

At this time, the vehicle speed is constantly monitored by the vehicle-speed detection part 14. When the vehicle speed exceeds the predetermined value (S16 of FIG. 5), the displayed image is returned to the state before the activation of the vehicle surroundings monitoring device 2 (S20 of FIG. 5) because it is not preferable to display the images of the surroundings of the vehicle in terms of safety. Then, the process exits from a display state of the vehicle surroundings monitoring device 2 (S1 of FIG. 5).

Moreover, the shift position is constantly detected by the shift-position detection part 13. When it is detected that the shift position is a position other than the reverse position (S19 of FIG. 5), the displayed image is returned to a state before the activation of the vehicle surroundings monitoring device 2 (S20 of FIG. 5) and the process exits from the display state of the vehicle surroundings monitoring device 2 (S1 of FIG. 5).

In the vehicle surroundings monitoring device 2 of Embodiment 1 configured as described above, even when there is a three-dimensional object in the boundary portion of the image capturing ranges of the adjacent cameras, the three-dimensional object can be accurately displayed without a blind spot by setting up the virtual screen in the boundary portion, generating the image to be projected on the virtual screen, and displaying the projection image. Accordingly, the situation of the surroundings of the vehicle can be accurately transmitted to the driver. This enables vehicle driving such as a parking operation and a turning operation to be performed smoothly.

Figure 9:
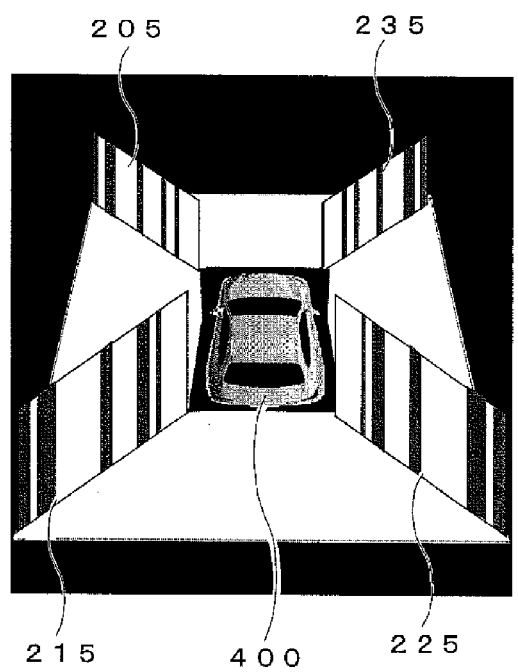
FIG. 9 is a view showing another display mode of Embodiment 1 of the present invention.

Although Embodiment 1 has a configuration in which the virtual-screen projection images and the synthesized road-surface projection image are synthesized and displayed, the configuration is not limited to this mode. Specifically, only the virtual-screen projection images may be displayed as shown in FIG. 9. This can be achieved in a configuration in which the road-surface projection image generation unit 50, the second viewpoint conversion unit 70, and the image synthesis unit 80 are omitted in FIG. 1. The display method of FIG. 9 has such an effect that the situation of an obstacle which is near the seam of the images and which is near the vehicle can be accurately displayed, the seam having a blind spot formed therein.

Moreover, although Embodiment 1 has a configuration in which the four virtual-screen projection images and the synthesized road-surface projection image are synthesized into one image and displayed, the configuration is not limited to this mode. Specifically, when the vehicle is traveling forward, only the first virtual-screen projection image 205, the fourth virtual-screen projection image 235, and the synthesized road-surface projection image 300 may be synthesized and displayed in FIG. 8A. This can be achieved by giving the third coordinate-conversion-data storage part 64 an instruction to create only the first virtual-screen projection image 205 and the fourth virtual-screen projection image 235 when the virtual viewpoint position and the virtual sight-line direction are set in the virtual viewpoint position/virtual sight-line direction setting part 66.

Figure 8B:
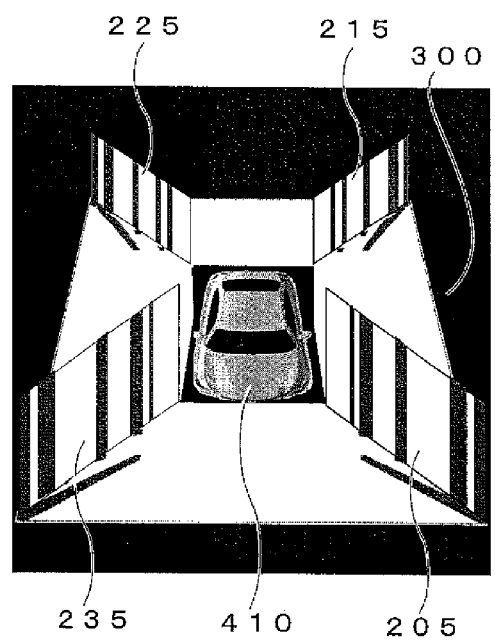
FIG. 8B is an example of an image displayed on the display monitor when the vehicle is travelling backward.

Moreover, when the vehicle is traveling backward, only the second virtual-screen projection image 215, the third virtual-screen projection image 225, and the synthesized road-surface projection image 300 may be synthesized and displayed in FIG. 8B. This can be achieved by giving the third coordinate-conversion-data storage part 64 an instruction to create only the second virtual-screen projection image 215 and the third virtual-screen projection image 225 when the virtual viewpoint position and the virtual viewpoint direction are set in the virtual viewpoint position/virtual sight-line direction setting part 66. This makes it possible to more emphatically show the information on the traveling direction of the vehicle. Thus, an instant readability of the image displayed on the monitor can be further improved.

Embodiment 2

Embodiment 2 is one in which the present invention is applied to a vehicle surroundings monitoring device 4 capable of displaying a situation of surroundings of a vehicle that is captured with multiple cameras installed in the vehicle in a mode easily viewable by a driver. Particularly, the embodiment 2 is one that includes an obstacle detection unit in the periphery of the vehicle, converts the images of the surroundings of the vehicle into a mode more easily recognizable on the basis of the output from the obstacle detection unit, and displays the converted images on a monitor installed in a vehicle interior.

Figure 10:
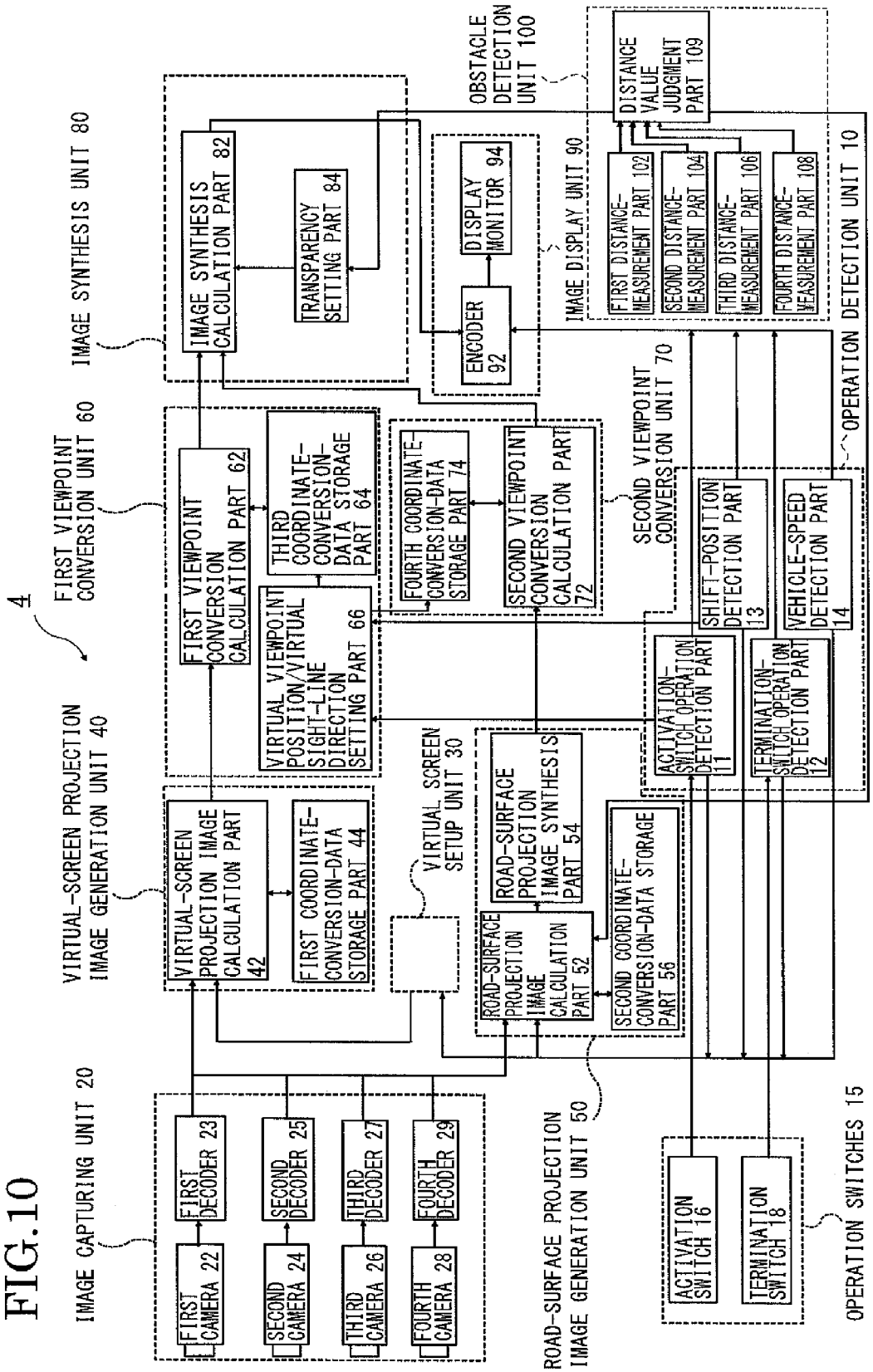
FIG. 10 is a block diagram showing a schematic configuration of a vehicle surroundings monitoring device of Embodiment 2 of the present invention.

FIG. 10 is a block diagram showing a configuration of the vehicle surroundings monitoring device 4 of Embodiment 2 of the present invention.

As shown in FIG. 10 the vehicle surroundings monitoring device 4 according to one or more embodiments of the present invention is installed in a vehicle 1 not illustrated and includes an operation detection unit 10, operation switches 15, an image capturing unit 20, a virtual-screen setup unit 30, a virtual-screen projection image generation unit 40, a road-surface projection image generation unit 50, a first viewpoint conversion unit 60, a second viewpoint conversion unit 70, an image synthesis unit 80, an image display unit 90, and an obstacle detection unit 100. The operation detection unit 10 detects an activation operation and a termination operation of the vehicle surroundings monitoring device 4 performed by the driver. The operation switches 15 are installed at positions within the reach of the driver and are used to instruct the activation and termination of the vehicle surroundings monitoring device 4. The image capturing unit 20 includes multiple cameras capturing images of the surroundings of the vehicle. The virtual-screen setup unit 30 sets up a virtual screen in an overlapping portion of the image capturing regions of each adjacent two of the multiple cameras included in the image capturing unit 20. The virtual-screen projection image generation unit 40 projects images respectively captured by the adjacent cameras on the virtual screens set up by the virtual-screen setup unit 30 and thereby generates virtual-screen projection images. The road-surface projection image generation unit 50 projects the captured images of the surroundings of the vehicle on the road surface and thereby generates road-surface projection images. The first viewpoint conversion unit 60 converts the virtual-screen projection images generated by the virtual-screen projection image generation unit 40 respectively into images captured from a predetermined virtual viewpoint in a predetermined virtual sight-line direction. The second viewpoint conversion unit 70 converts the road-surface projection image generated by the road-surface projection image generation unit 50 into an image captured from the predetermined virtual viewpoint in the predetermined virtual sight-line direction. The image synthesis unit 80 synthesizes the virtual-screen projection images subjected to the viewpoint conversion by the first viewpoint conversion unit 60 and the road-surface projection image subjected to the viewpoint conversion by the second viewpoint conversion unit 70 into one image. The image display unit 90 displays the image synthesized by the image synthesis unit 80. The obstacle detection unit 100 detects existence and absence of an obstacle exists in the surroundings of the vehicle 1 and calculates the distance to the obstacle.

More specifically, the operation detection unit 10 includes an activation-switch operation detection part 11 detecting the activation operation of the vehicle surroundings monitoring device 4 performed by the driver, a termination-switch operation detection part 12 detecting the termination operation of the vehicle surroundings monitoring device 4, a shift-position detection part 13 detecting a shift position of the vehicle, and a vehicle-speed detection part 14 detecting a vehicle speed.

More specifically, the operation switches 15 includes an activation switch 16 used to give an instruction to activate the vehicle surroundings monitoring device 4 and a termination switch 18 used to give an instruction to terminate the vehicle surroundings monitoring device 4.

Figure 11A:
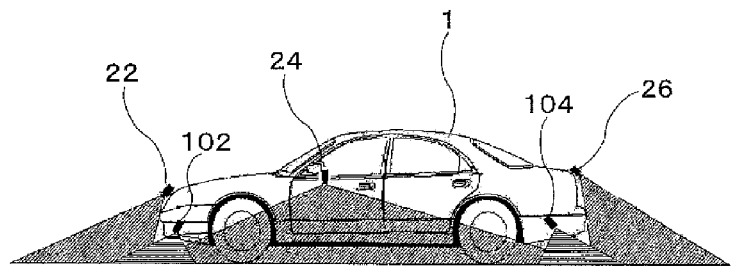
FIG. 11A is a left view of a vehicle in which Embodiment 2 of the present invention is installed.
Figure 11B:
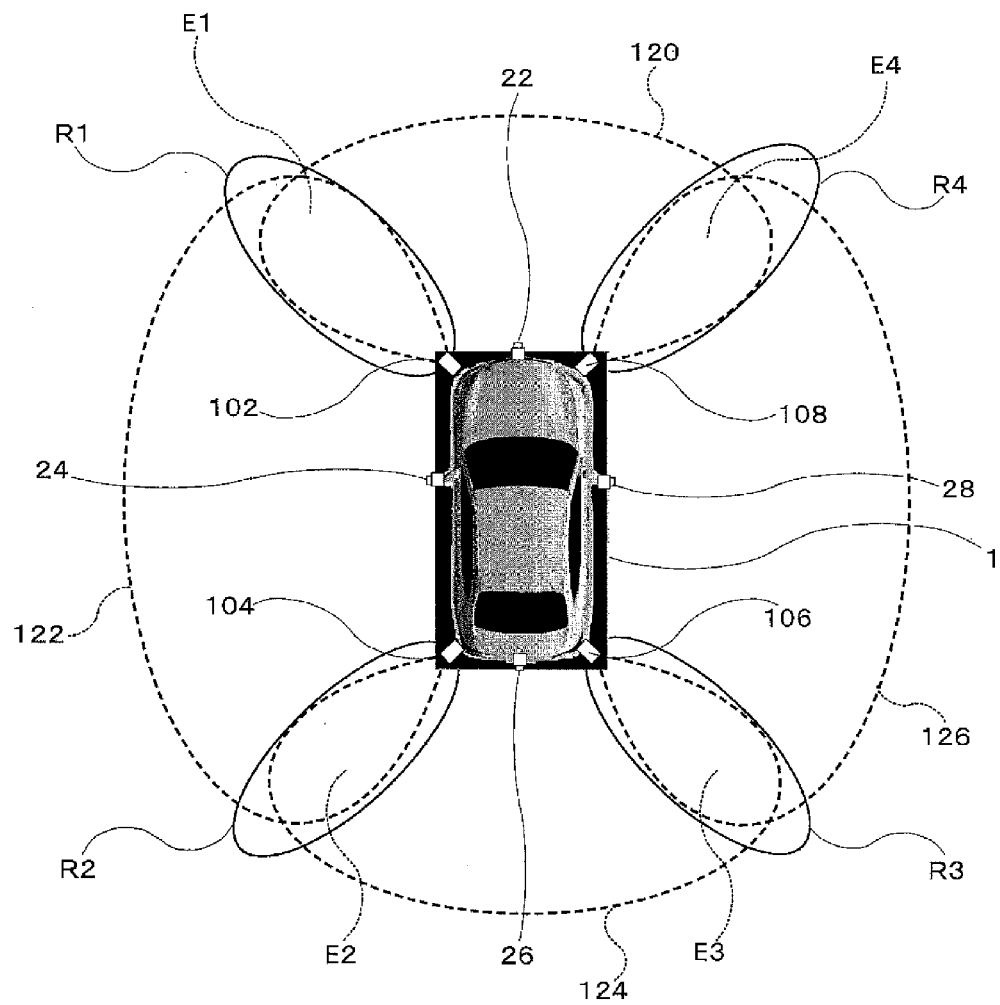
FIG. 11B is a top view of the vehicle in which Embodiment 2 of the present invention is installed.

More specifically, the image capturing unit 20 is installed in the periphery of the vehicle as shown in FIGS. 11A, 11B, and includes a first camera 22, a second camera 24, a third camera 26, a fourth camera 28, a first decoder 23 converting an output signal of the first camera 22 to a digital signal by performing AD conversion, a second decoder 25 converting an output signal of the second camera 24 to a digital signal by performing AD conversion, a third decoder 27 converting an output signal of the third camera 26 to a digital signal by performing AD conversion, and a fourth decoder 29 converting an output signal of the fourth camera 28 to a digital signal by performing AD conversion. The first camera 22 to the fourth camera 28 are disposed with the image capturing ranges of each adjacent two of the cameras overlapping each other.

More specifically, the virtual-screen projection image generation unit 40 includes a first coordinate-conversion-data storage part 44 and a virtual-screen projection image calculation part 42. The first coordinate-conversion-data storage part 44 stores a coordinate conversion data table created in advance based on the installed positions respectively of the first camera 22 to the fourth camera 28 and the installed positions respectively of the virtual screens to generate the virtual-screen projection images. The virtual-screen projection image calculation part 42 generates the virtual-screen projection images on the basis of the coordinate conversion data table stored in the first coordinate-conversion-data storage part 44.

More specifically, the road-surface projection image generation unit 50 includes a second coordinate-conversion-data storage part 56, a road-surface projection image calculation part 52 and a road-surface projection image synthesis part 54. The second coordinate-conversion-data storage part 56 stores a coordinate conversion data table created in advance based on the installed positions respectively of the first camera 22 to the fourth camera 28 to generate the road-surface projection images. The road-surface projection image calculation part 52 generates the road-surface projection images from the images captured by the respective cameras on the basis of the coordinate conversion data table stored in the second coordinate-conversion-data storage part 56. The road-surface projection image synthesis part 54 synthesizes multiple generated road-surface projection images into one image.

More specifically, the first viewpoint conversion unit 60 includes a virtual viewpoint position/virtual sight-line direction setting part 66, a third coordinate-conversion-data storage part 64, and a first viewpoint conversion calculation part 62. The virtual viewpoint position/virtual sight-line direction setting part 66 sets the virtual viewpoint position and the virtual sight-line direction used to generate a synthesized image of the virtual-screen projection images and the road-surface projection image, on the basis of a traveling direction of the vehicle 1 and the switch operation by the driver. The third coordinate-conversion-data storage part 64 stores a coordinate conversion data table used to perform the viewpoint conversion of the virtual-screen projection images in which the images are converted to images captured from the virtual viewpoint position in the virtual sight-line direction, the virtual viewpoint position and the virtual sight-line direction set by the virtual viewpoint position/virtual sight-line direction setting part 66. The first viewpoint conversion calculation part 62 performs the viewpoint conversion of the virtual-screen projection images on the basis of the coordinate conversion data table stored in the third coordinate-conversion-data storage part 64.

More specifically, the second viewpoint conversion unit 70 includes a fourth coordinate-conversion-data storage part 74 and a second viewpoint conversion calculation part 72. The fourth coordinate-conversion-data storage part 74 stores a coordinate conversion data table used to perform the viewpoint conversion of the road-surface projection image in which the image is converted to an image captured from the virtual viewpoint position in the virtual sight-line direction, the virtual viewpoint position and the virtual sight-line direction set by the virtual viewpoint position/virtual sight-line direction setting part 66. The second viewpoint conversion calculation part 72 performs the viewpoint conversion of the road-surface projection image on the basis of the coordinate conversion data table stored in the fourth coordinate-conversion-data storage part 74.

More specifically, the image synthesis unit 80 includes a transparency setting part 84 and an image synthesis calculation part 82. The transparency setting part 84 sets a transparency of portions where the images overlap each other when the virtual-screen projection images subjected to the viewpoint conversion by the first viewpoint conversion unit 60 and the road-surface projection image subjected to the viewpoint conversion by the second viewpoint conversion unit 70 are synthesized into one image. The image synthesis calculation part 82 synthesizes the virtual-screen projection images subjected to the viewpoint conversion by the first viewpoint conversion unit 60 and the road-surface projection image subjected to the viewpoint conversion by the second viewpoint conversion unit 70 at the transparency set by the transparency setting part 84, with the virtual-screen projection images in the foreground and the road-surface projection image in the background.

More specifically, the image display unit 90 includes: an encoder 92 that converts a digital signal of the image synthesized by the image synthesis unit 80 to an analog signal; and a display monitor 94 that displays the image converted to the analog signal by the encoder 92.

More specifically, the obstacle detection unit 100 is installed in the periphery of the vehicle 1 as shown in FIGS. 11A, 11B and includes a first distance-measurement part 102, a second distance-measurement part 104, a third distance-measurement part 106, a fourth distance-measurement part 108, and a distance value judgment part 109. The first distance-measurement part 102 detects existence and absence of an obstacle in a first distance measurement range R1 including a first overlapping region E1 being an overlapping range of the image capturing range of the first camera 22 and the image capturing range of the second camera 24, and calculates the distance to the obstacle. The second distance-measurement part 104 detects existence and absence of an obstacle in a second distance measurement range R2 including a second overlapping region E2 being an overlapping range of the image capturing range of the second camera 24 and the image capturing range of the third camera 26, and calculates the distance to the obstacle. The third distance-measurement part 106 detects existence and absence of an obstacle in a third distance measurement range R3 including a third overlapping region E3 being an overlapping range of the image capturing range of the third camera 26 and the image capturing range of the fourth camera 28, and calculates the distance to the obstacle. The fourth distance-measurement part 108 detects existence and absence of an obstacle in a fourth distance measurement range R4 including a fourth overlapping region E4 being an overlapping range of the image capturing range of the fourth camera 28 and the image capturing range of the first camera 22, and calculates the distance to the obstacle. The distance value judgment part 109 sets the transparency used in the image synthesis on the basis of the value of the measured distance to each of the obstacles.

Figure 12:
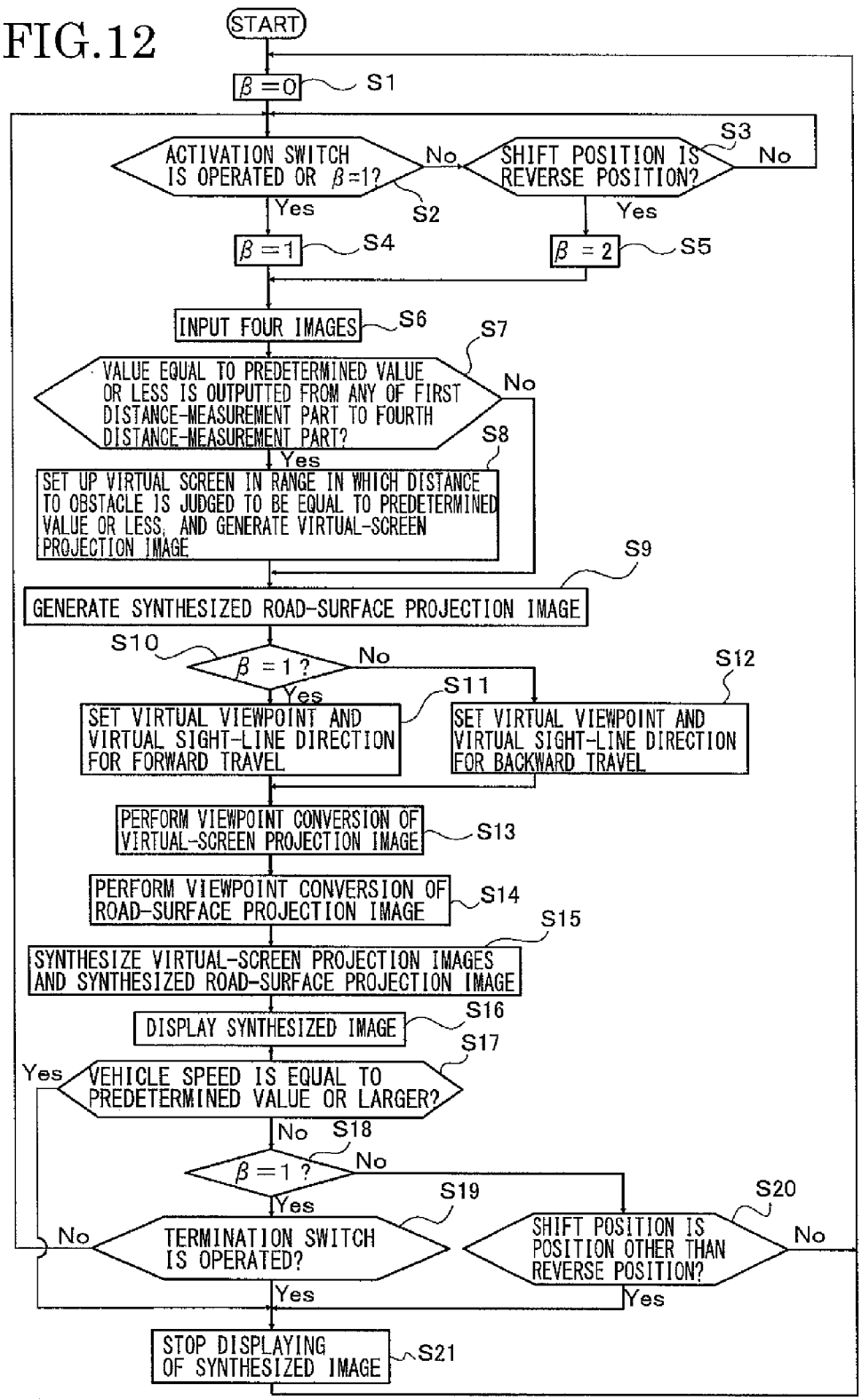
FIG. 12 is a flowchart for explaining an operation of Embodiment 2 of the present invention.

Next, an action of the vehicle surroundings monitoring device 4 of Embodiment 2 are described based on a flowchart of FIG. 12. The vehicle surroundings monitoring device 4 according to one or more embodiments of the present invention is used in a situation such as when the vehicle is parked or turned in a small space, and assists the driving operation by presenting the images of the surroundings of the vehicle to the driver.

As shown in FIG. 11A, the first camera 22, the second camera 24, and the third camera 26 are installed respectively in a front bumper of the vehicle 1, a left door mirror of the vehicle 1, and a rear bumper of the vehicle 1. Although not illustrated in FIG. 11A, the fourth camera 28 is installed in a right door mirror of the vehicle 1.

Furthermore, as shown in FIG. 11B, the first distance-measurement part 102, the second distance-measurement part 104, the third distance-measurement part 106, and the fourth distance-measurement part 108 are installed respectively in a left corner of the front bumper, a left corner of the rear bumper, a right corner of the rear bumper, and a right corner of the front bumper. These distance measurement parts are specifically formed of ultrasonic sensors or optical distance measurement sensors. However, any configuration is possible as long as the distance measurement parts have the function of measuring a distance.

Moreover, as shown in FIG. 11B, the cameras are installed to capture images of regions where the image capturing ranges thereof intersect with the road surface at intersection lines 120, 122, 124, and 126, respectively.

As shown in FIG. 11B, a set of the adjacent cameras 22 and 24, a set of adjacent cameras 24 and 26, a set of adjacent cameras 26 and 28, and a set of adjacent cameras 28 and 22 are installed in such manner that the image capturing ranges of the cameras overlap each other to have the first overlapping region E1, the second overlapping region E2, the third overlapping region E3, and the fourth overlapping region E4.

Moreover, the first distance-measurement part 102 to the fourth distance-measurement part 108 are arranged in such a manner that the first distance-measurement part 102 has a region including the first overlapping region E1 as the first distance measurement range R1, the second distance-measurement part 104 has a region including the second overlapping region E2 as the second distance measurement range R2, the third distance-measurement part 106 has a region including the third overlapping region E3 as the third distance measurement range R3, and the fourth distance-measurement part 108 has a region including the fourth overlapping region E4 as the fourth distance measurement range R4.

A description is given below of an operation of Embodiment 2 in a situation where the vehicle 1 is traveling forward at a very slow speed to park. When the surrounding of the vehicle is monitored, the driver operates the activation switch 16 provided in the vehicle interior. Then, the activation switch operation is detected by the activation-switch operation detection part 11 (S2 of FIG. 12). At this time, 1 is given to a variable 6 indicating the state of the vehicle surroundings monitoring device 4 (S4 of FIG. 12).

The images captured by the first camera 22 to the fourth camera 28 are sampled and quantized respectively by the first decoder 23 to the fourth decoder 29 and are thereby converted into digital images (S6 of FIG. 12). Here, the image captured by the first camera 22 is referred to as $I_1(x, y)$, the image captured by the second camera 24 is referred to as $I_2(x, y)$, the image captured by the third camera 26 is referred to as $I_3(x, y)$, and the image captured by the fourth camera 28 is referred to as $I_4(x, y)$.

Distance measurement of the surroundings of the vehicle is performed by the first distance-measurement part 102 to the fourth distance-measurement part 108 simultaneously with the image input, and each of the distance measurement parts outputs the value corresponding to the obstacle existing in the surroundings of the vehicle 1.

Here, to simplify the description, it is assumed that an environment in which Embodiment 2 operates is one shown in FIG. 13A. Specifically, it is assumed that, in an area to the left front of the vehicle 1, four columnar objects (first columnar object 301, second columnar object 302, third columnar object 303, and fourth columnar object 304) stand orthogonal to the road surface under the same condition as that described in Embodiment 1 and, in an area to the right rear of the vehicle 1, four columnar objects (fifth columnar object 305, sixth columnar object 306, seventh columnar object 307, and eighth columnar object 308) are disposed respectively at the four corners of a square while standing orthogonal to the road surface. Here, it assumed that the four columnar objects in the area to the left front of the vehicle 1 are within an alert-required range 420 in which alerting is required when the parking operation is to be performed, and the four columnar objects in the area to the right rear of the vehicle 1 are outside the alert-required range 420.

Each of the four distance measurement parts (102, 104, 106, and 108) outputs a smaller value corresponding to the distance, as the distance to the object (obstacle) having a height from the road surface becomes closer. In Embodiment 2, the first distance-measurement part 102 outputs the smallest value and the third distance-measurement part 106 outputs the second smallest value. Because there is no obstacle to the left rear and right front of the vehicle 1, an extremely large value indicating the absence of an obstacle is outputted from each of the second distance-measurement part 104 and the fourth distance-measurement part 108.

Next, the values respectively outputted from the four distance measurement parts (102, 104, 106, and 108) are sent to the distance value judgment part 109. Then, existence and absence of a distance measurement part outputting a value equal to or less than a predetermined value is detected and the position thereof is specified. In this example, it is specified that the value equal to or less than the predetermined value is outputted from the first distance-measurement part 102 (S7 of FIG. 12).

Then, the virtual-screen setup unit 30 sets up a planar first virtual screen 200 being orthogonal to the road surface and extending in a direction from the near side to the far side of the vehicle, with the first virtual screen 200 bisecting the area of the first overlapping region E1 included in the first distance measurement range R1 being the distance measurement range of the first distance-measurement part 102 specified as one outputting the value equal to or less than the predetermined value in the distance value judgment part 109.

Then, the virtual-screen projection image generation unit 40 performs conversion of the image I$_1$(x, y) and the image I$_2$(x, y) for projection onto the set-up first virtual screen 200, and the virtual-screen projection image is thereby generated (S8 of FIG. 12). A method of generating the virtual-screen projection image is the same as that described in Embodiment 1, and the description thereof is thereby omitted herein.

The virtual-screen projection image is generated in the virtual-screen projection image calculation part 42. However, a computing load is large when an intersection point with the first virtual screen 200 is calculated for each of the pixels in the image I$_1$(x, y) and the image I$_2$(x, y). Thus, a coordinate value of each of the image I$_1$(x, y) and the image I$_2$(x, y) for projection onto a certain pixel in a first virtual-screen projection image 205 are obtained in advance through calculation on the basis of the arrangement of the first camera 22 and the second camera 24. Then, a coordinate conversion table is created in advance based on the calculation result and is stored in the first coordinate-conversion-data storage part 44.

In the virtual-screen projection image calculation part 42, the computing load is reduced by executing the conversion for projection by performing substitution of the coordinates on the basis of the coordinate conversion table stored in the first coordinate-conversion-data storage part 44. The first virtual-screen projection image 205 is generated by this conversion for projection.

Next, the image I$_1$(x, y), the image I$_2$(x, y), the image I$_3$(x, y) and the image I$_4$(x, y) are projected on the road surface by the road-surface projection image calculation part 52 and are converted into images overlooking the vehicle from a position directly above the vehicle (S9 of FIG. 12).

A method of generating the road-surface projection images is the same as that described in Embodiment 1, and the description thereof is thereby omitted herein. The road-surface projection images are generated in the road-surface projection image calculation part 52. Specifically, in the case of the image I$_1$(x, y), the road-surface projection image is generated by obtaining points where half lines extending from a principal point P of the first camera 22 toward the pixels in the image I$_1$(x, y) captured by the first camera 22 intersect the road surface. The road-surface projection image is generated in a similar way for the image I$_2$(x, y).

Here, a computing load is large when the intersection point with the road surface is calculated for each of the pixels in the image I$_1$(x, y) and the image I$_2$(x, y). Thus, a coordinate value of each of the image I$_1$(x, y) and the image I$_2$(x, y) for projection onto a certain point on the road surface is obtained in advance through calculation on the basis of the arrangement of the first camera 22 and the second camera 24. Then, a coordinate conversion table is created in advance based on the calculation result and is stored in the second coordinate-conversion-data storage part 56.

A specific method of generating the road-surface projection images is the same as that described in Embodiment 1, and the description thereof is thereby omitted herein.

When the environment in which Embodiment 2 operates is one shown in FIG. 13A, the road-surface projection images of the four images captured by the four cameras are synthesized as shown in FIG. 13B.

Here, because the vehicle 1 and portions close thereto are outside the fields of view of the cameras, a unique value is stored to notify the driver that the information is missing. For example, the gray value is substituted with the minimum value or the maximum value. Thus, a synthesized road-surface projection image 300 as shown in FIG. 13C is generated.

Next, the first viewpoint conversion unit 60 converts the first virtual-screen projection image 205 generated in S8 of FIG. 12 into an image of observation from the predetermined viewpoint position in the predetermined sight-line direction.

In this conversion, the predetermined viewpoint position and the predetermined sight-line direction are determined by the virtual viewpoint position/virtual sight-line direction setting part 66 on the basis of information detected by the operation detection unit 10.

Specifically, when 1 is given to the variable B indicating the state of the vehicle surroundings monitoring device 4 (S10 of FIG. 12), the virtual viewpoint is set at a position above and rearward of the vehicle 1 and the virtual sight-line direction is set in such a way that an area ahead of the vehicle 1 is overlooked from the virtual viewpoint (S11 of FIG. 12).

Moreover, the coordinate conversion table for performing the viewpoint conversion of the virtual-screen projection image in a manner as if observation is performed from the set virtual viewpoint position in the set virtual sight-line direction is created and stored in the third coordinate-conversion-data storage part 64 in advance, and the first viewpoint conversion calculation part 62 performs the viewpoint conversion on the basis of the coordinate conversion table (S13 of FIG. 12).

Moreover, the second viewpoint conversion unit 70 converts the synthesized road-surface projection image 300 generated in S9 of FIG. 12 to an image of observation from the same viewpoint position in the same sight-line direction as those set by the virtual viewpoint position/virtual sight-line direction setting part 66.

Specifically, the coordinate conversion table for performing the viewpoint conversion of the synthesized road-surface projection image 300 in a manner as if observation is performed from the set virtual viewpoint position in the set virtual sight-line direction is created and stored in the fourth coordinate-conversion-data storage part 74 in advance, and the second viewpoint conversion calculation part 72 performs the viewpoint conversion on the basis of the coordinate conversion table (S14 of FIG. 12).

Next, the first virtual-screen projection image 205 generated by the first viewpoint conversion calculation part 62 and the synthesized road-surface projection image 300 generated by the second viewpoint conversion calculation part 72 are synthesized into one image in the image synthesis unit 80 with the first virtual-screen projection image 205 in the foreground and the synthesized road-surface projection image 300 in the background (S15 of FIG. 12).

The image synthesis is performed by the image synthesis calculation part 82 on the basis of a rule determined by the transparency setting part 84.

Provided that the first virtual-screen projection image 205 generated by the first viewpoint conversion calculation part 62 is K(x, y), the synthesized road-surface projection image 300 generated by the second viewpoint conversion calculation part 72 is L(x, y), and the image to be synthesized by the image synthesis unit 80 is M(x, y), M(x, y) is calculated by using Formula 1 described above.

In this formula, a transparency parameter $\alpha$ takes a value within a range of $0 \le \alpha \le 1$. The value of $\alpha$ is set in advance and is stored in the transparency setting part 84. In Embodiment 2, $\alpha$ is set to 1. This is such a setting that, when virtual-screen projection images (205, 215, 225, and 235) and the synthesized road-surface projection image 300 overlap each other, the synthesized road-surface projection image 300 synthesized in the background is made invisible.

Figure 14B:
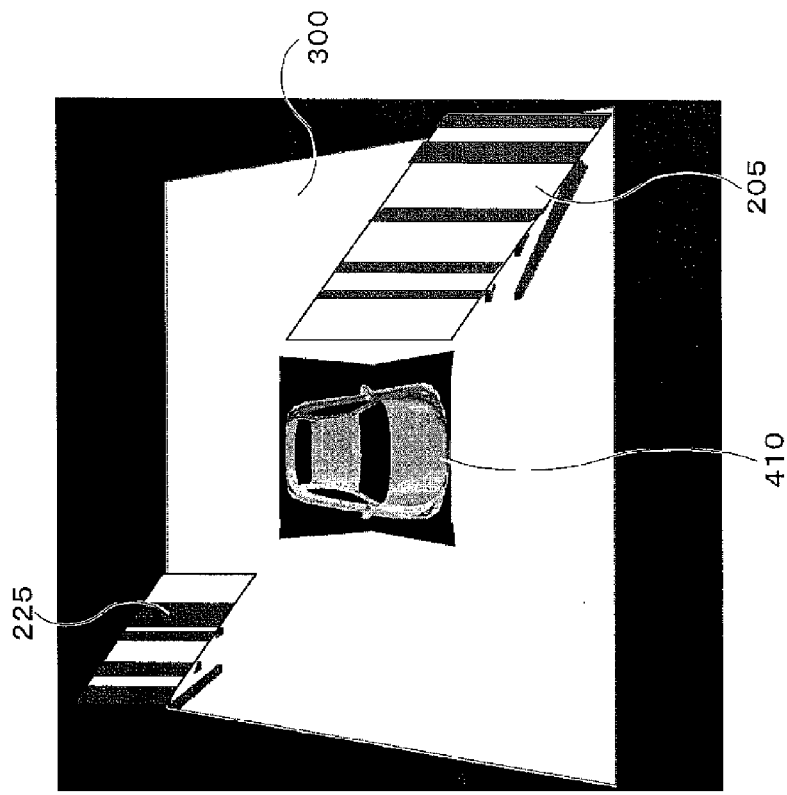
FIG. 14B is an example of an image displayed on the display monitor when the vehicle is travelling backward.
Figure 14A:
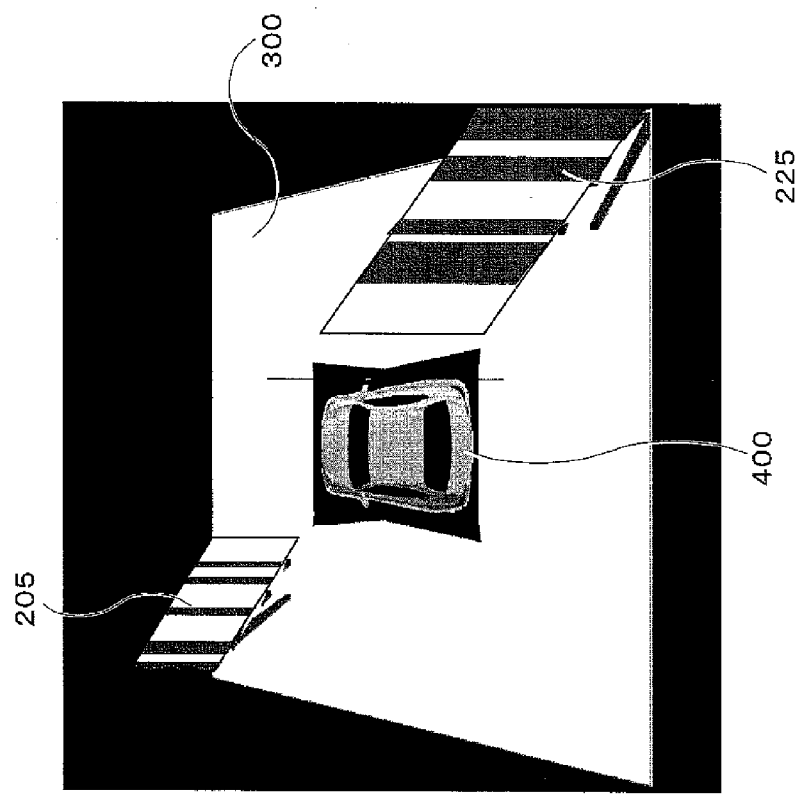
FIG. 14A is an example of an image displayed on a display monitor when the vehicle is travelling forward.

An example of the synthesized image thus obtained is shown in FIG. 14A. In the drawing, regions that are blacked out are regions outside the field of view of the image capturing unit 20, which correspond to the position of the vehicle 1 and the close vicinity of the vehicle 1 and regions other than the virtual-screen projection images and the synthesized road-surface projection image.

Here, a first vehicle icon 400 showing its rear may be displayed at the position of the vehicle 1 in a superimposed manner to more clearly show the front-rear positional relationship.

The synthesized image of FIG. 14A obtained as described above is subjected to DA conversion by the encoder 92 and is displayed on the display monitor 94 provided inside the vehicle 1 (S16 of FIG. 12).

At this time, the vehicle speed is constantly detected by the vehicle-speed detection part 14. When the detected vehicle speed exceeds a predetermined value (S17 of FIG. 12), the displayed image is returned to a state before the activation of the vehicle surroundings monitoring device 4 (S21 of FIG. 12) and the process proceeds to a non-display state of the vehicle surroundings monitoring device 4 (S1 of FIG. 12).

Moreover, when the termination-switch operation detection part 12 detects the operation of the termination switch 18 (S19 of FIG. 12), the displayed image is returned to the state before the activation of the vehicle surroundings monitoring device 4 (S21 of FIG. 12) and the process proceeds to the non-display state of the vehicle surroundings monitoring device 4 (S1 of FIG. 12).

The description has been given above of the operation in the case where the vehicle 1 is traveling forward. When the vehicle 1 is traveling backward, an image of an area behind the vehicle is displayed. The flow of operation in such a case is almost identical to that in the case where the vehicle is traveling forward. Thus, only the different points are described.

When it is detected in the shift-position detection part 13 that the shift position is at a reverse position (S3 of FIG. 12), 2 is stored in the variable $\beta$ indicating the state of a system (S5 of FIG. 12). Then, in the virtual viewpoint position/virtual sight-line direction setting part 66, the virtual viewpoint is set at a position forward and above the vehicle 1 and the virtual sight-line direction is set in such a way that an area behind the vehicle 1 is overlooked from the virtual viewpoint (S12 of FIG. 12).

The virtual-screen projection images and the synthesized road-surface projection image 300 generated in a way similar to the case where the vehicle is traveling forward are synthesized by the image synthesis calculation part 82 and, as shown in FIG. 14B, the synthesized image is displayed on the display monitor 94 as an image overlooking the area behind the vehicle (S16 of FIG. 12). At this time, a second vehicle icon 410 showing its front may be displayed at the position of the vehicle 1 in a superimposed manner to more clearly show the front-rear positional relationship.

At this time, the vehicle speed is constantly detected by the vehicle-speed detection part 14. When the detected vehicle speed exceeds the predetermined value (S17 of FIG. 12), the displayed image is returned to the state before the activation of the vehicle surroundings monitoring device 4 (S21 of FIG. 12), and the process proceeds to the non-display state of the vehicle surroundings monitoring device 4 (S1 of FIG. 12).

Moreover, the shift position is constantly detected by the shift-position detection part 13. When it is detected that the shift position is a position other than the reverse position (S20 of FIG. 12), the displayed image is returned to a state before the activation of the vehicle surroundings monitoring device 4 (S21 of FIG. 12) and the process proceeds to the non-display state of the vehicle surroundings monitoring device 4 (S1 of FIG. 12).

The vehicle surroundings monitoring device 4 of Embodiment 2 configured as described above has such a configuration that the virtual screen is set up only in the region where the obstacle is detected and the virtual-screen projection image is generated and displayed on the virtual screen. Thus, the virtual-screen projection image is displayed only when the obstacle exists at a position in the seam of the images, which would be a blind spot in a conventional vehicle surroundings monitoring device. This makes it possible to further improve the visibility in the case where an obstacle exists.

Moreover, in Embodiment 2, the synthesized image is generated as follows. The virtual screen is set up at a position corresponding to a region in which the obstacle is detected when the distance to the obstacle is equal to or less than the predetermined value, and the synthesized road-surface projection image 300 overlapping the virtual-screen projection image generated by projecting the image on the virtual screen is set to be invisible by setting the transparency parameter α to 1 in the transparency setting part 84. However, the generation of the synthesized image is not limited to this mode.

Specifically, the transparency parameter α is set in the transparency setting part 84 depending on a value D1 corresponding to the distance to the obstacle, which is measured and outputted by the first distance-measurement part 102, a value D2 corresponding to the distance to the obstacle, which is measured and outputted by the second distance-measurement part 104, a value D3 corresponding to the distance to the obstacle, which is measured and outputted by the third distance-measurement part 106, and a value D4 corresponding to the distance to the obstacle, which is measured and outputted by the fourth distance-measurement part 108 in the following way. When the value Di (i=1, 2, 3, 4) corresponding the distance is larger than first distance threshold Dmax, the transparency parameter α is set to 0 to make the corresponding virtual-screen projection image invisible. When Di is smaller than a second distance threshold Dmin, the transparency parameter α is set to 1 to make the synthesized road-surface projection image 300 invisible. When it is Dmin<Di<Dmax, the transparency parameter α is set to a larger value as the value Di corresponding to the distance becomes smaller, the value not exceeding 1. Hence, the virtual-screen projection image is displayed more clearly as the distance to the obstacle becomes closer. An example of the transparency parameter α set as described above is shown in FIG. 15.

Figure 15:
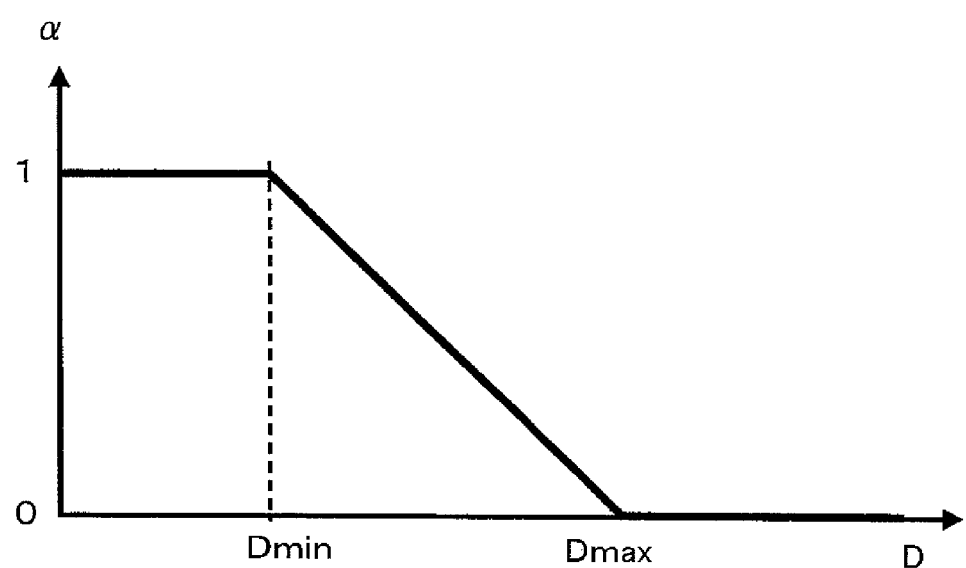
FIG. 15 is a view showing an example of a transparency parameter set by a transparency setting unit.

By setting the transparency as shown in FIG. 15, the approach to the obstacle can be more clearly transmitted to the driver.

Furthermore, the following display mode may be employed. A time change of each of the values D1 to D4 corresponding to the distances to the obstacles, which are respectively outputted from the first distance-measurement part 102 to the fourth distance-measurement part 108 is observed in the distance value judgment part 109. When Di (i=1, 2, 3, 4) becomes smaller (closer) as the time elapses, it is judged that the vehicle 1 is approaching the obstacle and the value of α is increased (within a range not exceeding 1). Thus, the synthesized road-surface projection image to be synthesized behind the virtual-screen projection image is made less visible, and the situation where the vehicle is approaching the obstacle can be more clearly transmitted. In contrast, when Di (i=1, 2, 3, 4) becomes larger (farther) as the time elapses, it is judged that the vehicle 1 is moving away from the obstacle and the value of α is decreased (within a range not falling below 0). Thus, the synthesized road-surface projection image to be synthesized behind the virtual-screen projection image is made more visible, and the situation where the vehicle is moving away from the obstacle can be more clearly transmitted.

Moreover, in Embodiment 2, each of the planar virtual screens being orthogonal to the road surface and extending in the direction from the near side to the far side of the vehicle is set up at such a position that the virtual screen bisects the area of the corresponding overlapping region of the image capturing ranges of the adjacent cameras. However, the invention is not limited to this mode. Specifically, the following configuration may be employed. The distance measurement parts (102, 104, 106, 108) are each made to have a function of scanning the distance measurement range in horizontal directions (peripheral directions of the vehicle) and measuring distance information for each of angles of the horizontal directions. A planar virtual screen is set up, the virtual screen orthogonally standing from the road surface and extending in a direction in which obstacle information has been obtained. The virtual-screen projection image is generated on the virtual screen and is displayed.

In this method, the virtual screen is set up in the direction in which the obstacle exists. Thus, the figure of the obstacle in the virtual-screen projection image is projected from the two adjacent cameras capturing the obstacle to the same position on the virtual screen. Accordingly, the gray values of the figure representing the obstacle are added to be a large value in the virtual-screen projection image. This makes the obstacle to be displayed more clearly, and such an effect that the visibility of the image is improved can be obtained.

CROSS-REFERENCE TO RELATED APPLICATION

The present application claims the priority based on Japanese Patent Application No. 2010-052762 filed with Japanese Patent Office on Mar. 10, 2010, and the entire disclosure thereof is completely incorporated in this description by reference.

The invention claimed is:

1. A vehicle surroundings monitoring device, comprising:
  a plurality of image capturing units installed in a vehicle to capture images of surroundings of the vehicle such that image capturing ranges, of adjacent image capturing units of the plurality of image capturing units, partially have an overlapping region;
  a virtual-screen setup unit configured to set up a virtual screen in the overlapping region of the image capturing ranges, the virtual screen extending in a direction from a near side to a far side of the vehicle and standing upright from a road surface in a vertical direction;
  a virtual-screen projection image generation unit configured to store a value corresponding to a gray value stored in each pixel of the image captured by each of the adjacent image capturing units of the plurality of image capturing units, at a position where a half line intersects the virtual screen, the half line extending from a position corresponding to a principle point of each of the plurality of image capturing units toward each pixel of the image captured by each of the plurality of image capturing units;
  a first viewpoint conversion unit configured to perform coordinate conversion in which an image generated by the virtual-screen projection image generation unit is converted to an image of observation from a predetermined viewpoint position in a predetermined sight-line direction and to output the converted image; and
  an image display unit configured to display the converted image outputted from the first viewpoint conversion unit
  wherein the virtual-screen setup unit sets a setup position of the virtual screen on a basis of a traveling direction of the vehicle.

2. The vehicle surroundings monitoring device according to claim 1,
  wherein the vehicle surroundings monitoring device further comprises:
    an activation switch; and
    an operation detection unit configured to detect an operation of the activation switch and a shift position of the vehicle, and
  wherein the first viewpoint conversion unit determines the predetermined viewpoint position and the predetermined sight-line direction on a basis of the operation of the activation switch and the shift position.

3. The vehicle surroundings monitoring device according to claim 2, wherein the virtual-screen setup unit sets up the virtual screen in the overlapping region of the image capturing ranges of the adjacent image capturing units of the plurality of image capturing units at such a position that the virtual screen almost bisects an area of the overlapping region.

4. The vehicle surroundings monitoring device according to claim 1, wherein the virtual-screen setup unit sets up the virtual screen in the overlapping region of the image capturing ranges of the adjacent image capturing units of the plurality of image capturing units at such a position that the virtual screen almost bisects an area of the overlapping region.

5. The vehicle surroundings monitoring device according to claim 1,
wherein the vehicle surroundings monitoring device further comprises a plurality of obstacle detection units each configured to output a distance from the vehicle to an object existing near the vehicle and having a height from the road surface in the overlapping region of the image capturing ranges of the adjacent image capturing units of the plurality of image capturing units, and
wherein when it is detected that the distance to the object having the height from the road surface is smaller than a predetermined value or when it is detected that the distance to the object having the height from the road surface becomes smaller as time elapses, the virtual-screen setup unit:
sets up the virtual screen in the overlapping region of the image capturing ranges of the adjacent image capturing units of the plurality of image capturing units, the overlapping region corresponding to an installed position of at least one of the plurality of obstacle detection units outputting a detection result; and
generates and displays a virtual-screen projection image on the virtual screen.

6. The vehicle surroundings monitoring device according to claim 1, further comprising obstacle detection units,
wherein the obstacle detection units have a function of outputting a distance to an object existing near the vehicle and having a height from the road surface over a peripheral direction of the vehicle in the overlapping region of the image capturing ranges of the adjacent image capturing units of the plurality of image capturing units, and
wherein when it is detected that the distance to the object having the height from the road surface is smaller than a predetermined value or when it is detected that the distance to the object having the height from the road surface becomes smaller as time elapses, the virtual-screen setup unit:
sets up a virtual screen standing upright from the road surface in the vertical direction and extending in a direction from the near side to the far side of the vehicle, the virtual screen extending in a direction in which the detected object exists; and
generates and displays a virtual-screen projection image on the virtual screen.

7. A vehicle surroundings monitoring device, comprising:
a plurality of image capturing units installed in a vehicle to capture images of surroundings of the vehicle such that image capturing ranges, of adjacent image capturing units of the plurality of image capturing units, partially have an overlapping region;
a virtual-screen setup unit configured to set up a virtual screen in the overlapping region of the image capturing ranges, the virtual screen extending in a direction from a near side to a far side of the vehicle and standing upright from a road surface in a vertical direction;
a virtual-screen projection image generation unit configured to store a value corresponding to a gray value stored in each pixel of the image captured by each of the adjacent ones of the image capturing units of the plurality of image capturing units, at a position where a half line intersects the virtual screen, the half line extending from a position corresponding to a principle point of each of the plurality of image capturing units toward each pixel of the image captured by each of the plurality of image capturing units;
a first viewpoint conversion unit configured to perform coordinate conversion in which an image generated by the virtual-screen projection image generation unit is converted to an image of observation from a predetermined viewpoint position in a predetermined sight-line direction and to output the converted image;
a road-surface projection image generation unit configured to store the gray value stored in each pixel of the image captured by each of the plurality of image capturing units, at a position where a half line intersects the road surface, the half line extending from a position corresponding to a principle point of each of the plurality of image capturing units toward each pixel of the image captured by each of the plurality of image capturing units; a second viewpoint conversion unit configured to perform coordinate conversion in which an image generated by the road-surface projection image generation unit is converted to an image of observation from the predetermined viewpoint position in the predetermined sight-line direction and to output the converted image;
an image synthesis unit configured to synthesize the converted image outputted from the first viewpoint conversion unit and the converted image outputted from the second viewpoint conversion unit into one image and to output the one image; and
an image display unit configured to display the one image outputted from the image synthesis unit.

8. The vehicle surroundings monitoring device according to claim 7,
wherein the vehicle surroundings monitoring device further comprises:
an activation switch; and
an operation detection unit configured to detect an operation of the activation switch and a shift position of the vehicle, and
wherein the first viewpoint conversion unit and the second viewpoint conversion unit determine the predetermined viewpoint position and the predetermined sight-line direction on a basis of the operation of the activation switch and the shift position.

9. The vehicle surroundings monitoring device according to claim 8, wherein the virtual-screen setup unit sets up the virtual screen in the overlapping region of the image capturing ranges of the adjacent image capturing units of the plurality of image capturing units at such a position that the virtual screen almost bisects an area of the overlapping region.

10. The vehicle surroundings monitoring device according to claim 7, wherein the virtual-screen setup unit sets up the virtual screen in the overlapping region of the image capturing ranges of the adjacent image capturing units of the plurality of image capturing units at such a position that the virtual screen almost bisects an area of the overlapping region.

11. The vehicle surroundings monitoring device according to claim 7, wherein the virtual-screen setup unit sets a setup position of the virtual screen on a basis of a traveling direction of the vehicle.

12. The vehicle surroundings monitoring device according to claim 7,
wherein the vehicle surroundings monitoring device further comprises a plurality of obstacle detection units each configured to output a distance from the vehicle to an object existing near the vehicle and having a height from the road surface in the overlapping region of the image capturing ranges of the adjacent image capturing units of the plurality of image capturing units, and
wherein when it is detected that the distance to the object having the height from the road surface is smaller than a predetermined value or when it is detected that the distance to the object having the height from the road surface becomes smaller as time elapses, the virtual-screen setup unit:
sets up the virtual screen in the overlapping region of the image capturing ranges of the adjacent image capturing units of the plurality of image capturing units, the overlapping region corresponding to an installed position of at least one of the plurality of obstacle detection units outputting a detection result; and
generates and displays a virtual-screen projection image on the virtual screen.

13. The vehicle surroundings monitoring device according to claim 7, further comprising obstacle detection units,
wherein the obstacle detection units have a function of outputting a distance to an object existing near the vehicle and having a height from the road surface over a peripheral direction of the vehicle in the overlapping region of the image capturing ranges of the adjacent image capturing units of the plurality of image capturing units, and
wherein when it is detected that the distance to the object having the height from the road surface is smaller than a predetermined value or when it is detected that the distance to the object having the height from the road surface becomes smaller as time elapses, the virtual-screen setup unit:
sets up a virtual screen standing upright from the road surface in the vertical direction and extending from the near side to the far side of the vehicle, the virtual screen extending in a direction in which the detected object exists and generates and displays a virtual-screen projection image on the virtual screen.

14. The vehicle surroundings monitoring device according to claim 7,
wherein the image synthesis unit includes comprises:
a transparency setting part configured to set a transparency of each of the images synthesized in a manner overlapping each other; and
an image synthesis part configured to perform image synthesis at the transparency set by the transparency setting unit,
wherein the image outputted from the first viewpoint conversion unit and the image outputted from the second viewpoint conversion unit are synthesized with the image outputted from the first viewpoint conversion unit in a foreground and the image outputted from the second viewpoint conversion unit in a background, and
wherein the transparency setting unit sets the transparency in such a way that the image outputted from the second viewpoint conversion unit is made invisible.

15. The vehicle surroundings monitoring device according to claim 7, further comprising obstacle detection units and a transparency setting unit, wherein when the obstacle detection units detect that a distance to an object having a height from the road surface is smaller than a predetermined value or when the obstacle detection units detect that the distance to the object having the height from the road surface becomes smaller as time elapses, a transparency of the virtual-screen projection image set up in the overlapping region of the image capturing ranges of the adjacent image capturing units of the plurality of image capturing units is set in the transparency setting unit in such a way that the road-surface projection image synthesized behind the virtual-screen projection image is made less visible as the distance to the object having the height from the road surface becomes closer, the overlapping region corresponding to an installed position of at least one of the obstacle detection units outputting the detection result.

* * * * *